United States Patent
Lawson et al.

(10) Patent No.: US 11,444,985 B2
(45) Date of Patent: Sep. 13, 2022

(54) SYSTEM AND METHOD FOR PROCESSING TELEPHONY SESSIONS

(71) Applicant: Twilio Inc., San Francisco, CA (US)

(72) Inventors: Jeff Lawson, San Francisco, CA (US); John Wolthuis, San Francisco, CA (US); Evan Cooke, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

(21) Appl. No.: 17/061,307

(22) Filed: Oct. 1, 2020

(65) Prior Publication Data

US 2021/0021651 A1  Jan. 21, 2021

Related U.S. Application Data

(63) Continuation of application No. 16/520,195, filed on Jul. 23, 2019, now Pat. No. 10,893,079, which is a
(Continued)

(51) Int. Cl.
| | |
|---|---|
| *H04L 65/1069* | (2022.01) |
| *H04M 1/247* | (2021.01) |
| *H04M 7/00* | (2006.01) |
| *H04L 65/1104* | (2022.01) |
| *G06F 9/54* | (2006.01) |

(Continued)

(52) U.S. Cl.
CPC .......... *H04L 65/1069* (2013.01); *G06F 9/541* (2013.01); *H04L 9/0643* (2013.01); *H04L 9/3247* (2013.01); *H04L 65/1104* (2022.05); *H04L 67/02* (2013.01);
(Continued)

(58) Field of Classification Search
None
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |

(Continued)

FOREIGN PATENT DOCUMENTS

| | | |
|---|---|---|
| AU | 2009231676 A1 | 10/2009 |
| AU | 2009231676 B2 | 10/2013 |

(Continued)

OTHER PUBLICATIONS

"U.S. Appl. No. 17/061,311, Preliminary Amendment filed Oct. 2, 2020", 5 pgs.

(Continued)

*Primary Examiner* — Otis L Thompson, Jr.
(74) *Attorney, Agent, or Firm* — Schwegman Lundberg & Woessner, P.A.

(57) ABSTRACT

In one embodiment, the method of processing telephony sessions includes: communicating with an application server using an application layer protocol; processing telephony instructions with a call router; and creating call router resources accessible through a call router Application Programming Interface (API). In another embodiment, the system for processing telephony sessions includes: a call router, a URI for an application server, a telephony instruction executed by the call router, and a call router API resource.

20 Claims, 16 Drawing Sheets

Related U.S. Application Data continuation of application No. 16/247,214, filed on Jan. 14, 2019, now Pat. No. 10,986,142, which is a continuation of application No. 15/871,794, filed on Jan. 15, 2018, now Pat. No. 10,560,495, which is a continuation of application No. 15/412,933, filed on Jan. 23, 2017, now Pat. No. 9,906,571, which is a continuation of application No. 15/245,456, filed on Aug. 24, 2016, now Pat. No. 9,596,274, which is a continuation of application No. 14/459,615, filed on Aug. 14, 2014, now Pat. No. 9,456,008, which is a continuation of application No. 13/743,080, filed on Jan. 16, 2013, now Pat. No. 8,837,465, which is a continuation of application No. 13/632,798, filed on Oct. 1, 2012, now abandoned, which is a continuation of application No. 12/417,630, filed on Apr. 2, 2009, now Pat. No. 8,306,021.

(60) Provisional application No. 61/156,746, filed on Mar. 2, 2009, provisional application No. 61/156,751, filed on Mar. 2, 2009, provisional application No. 61/100,578, filed on Sep. 26, 2008, provisional application No. 61/055,417, filed on May 22, 2008, provisional application No. 61/041,829, filed on Apr. 2, 2008.

(51) Int. Cl.
*H04L 67/02* (2022.01)
*H04L 9/06* (2006.01)
*H04L 9/32* (2006.01)

(52) U.S. Cl.
CPC ......... *H04M 1/2473* (2013.01); *H04M 7/003* (2013.01); *H04M 7/0021* (2013.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,633,914 A | 5/1997 | Rosa |
| 5,867,495 A | 2/1999 | Elliott et al. |
| 5,896,506 A | 4/1999 | Ali et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,442,159 B2 | 8/2002 | Josse et al. |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,811 B2 | 3/2004 | Greenberg et al. |
| 6,707,889 B1 | 3/2004 | Saylor et al. |
| 6,707,899 B2 | 3/2004 | Saito et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,801,604 B2 | 10/2004 | Maes et al. |
| 6,807,529 B2 | 10/2004 | Johnson et al. |
| 6,807,574 B1 | 10/2004 | Partovi et al. |
| 6,813,690 B1 | 11/2004 | Lango et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,892,064 B2 | 5/2005 | Qi et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,934,858 B2 | 8/2005 | Woodhill |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,727 B1 | 9/2005 | Brynielsson |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,993,658 B1 | 1/2006 | Engberg et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,046,778 B2 | 5/2006 | Martin et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,080,049 B2 | 7/2006 | Truitt et al. |
| 7,085,727 B2 | 8/2006 | Vanorman |

(56) References Cited

U.S. PATENT DOCUMENTS

| | | |
|---|---|---|
| 7,089,310 B1 | 8/2006 | Ellerman et al. |
| 7,092,370 B2 * | 8/2006 | Jiang .................. H04L 51/38 370/329 |
| 7,103,003 B2 | 9/2006 | Brueckheimer et al. |
| 7,103,171 B1 | 9/2006 | Annadata et al. |
| 7,106,844 B1 | 9/2006 | Holland |
| 7,110,513 B2 | 9/2006 | Halpern et al. |
| 7,110,514 B2 | 9/2006 | Brown et al. |
| 7,111,163 B1 | 9/2006 | Haney |
| 7,136,932 B1 | 11/2006 | Schneider |
| 7,140,004 B1 | 11/2006 | Kunins et al. |
| 7,142,662 B2 | 11/2006 | Rodenbusch et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,231,035 B2 | 6/2007 | Walker et al. |
| 7,245,611 B2 | 7/2007 | Narasimhan et al. |
| 7,260,208 B2 | 8/2007 | Cavalcanti |
| 7,266,181 B2 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,830 B2 | 11/2007 | Guedalia et al. |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,383,572 B2 | 6/2008 | Rolfe |
| 7,395,050 B2 | 7/2008 | Tuomi et al. |
| 7,412,525 B2 | 8/2008 | Cafarella et al. |
| 7,418,090 B2 | 8/2008 | Reding et al. |
| 7,426,750 B2 | 9/2008 | Cooper et al. |
| 7,428,302 B2 | 9/2008 | Zirngibl et al. |
| 7,431,202 B1 | 10/2008 | Meador et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,565,547 B2 | 7/2009 | Matta et al. |
| 7,571,226 B1 | 8/2009 | Partovi et al. |
| 7,577,847 B2 | 8/2009 | Nguyen et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,756,507 B2 | 7/2010 | Morper et al. |
| 7,764,955 B1 | 7/2010 | Mangal et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,946,913 B2 | 5/2011 | Yacenda |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,983,404 B1 | 7/2011 | Croak et al. |
| 7,992,120 B1 | 8/2011 | Wang et al. |
| 8,023,425 B2 | 9/2011 | Raleigh |
| 8,024,567 B2 | 9/2011 | Han |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,082,576 B2 | 12/2011 | Flynn et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,166,299 B2 | 4/2012 | Kemshall |
| 8,169,936 B2 | 5/2012 | Koren et al. |
| 8,175,007 B2 | 5/2012 | Jain et al. |
| 8,185,619 B1 | 5/2012 | Maiocco et al. |
| 8,190,670 B2 | 5/2012 | Gavrilescu et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,244,822 B1 | 8/2012 | Lowry et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,302,175 B2 | 10/2012 | Thoursie et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |

(56) References Cited

U.S. PATENT DOCUMENTS

| | | |
|---|---|---|
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,416,923 B2 | 4/2013 | Lawson et al. |
| 8,417,817 B1 | 4/2013 | Jacobs |
| 8,429,827 B1 | 4/2013 | Wetzel |
| 8,438,315 B1 | 5/2013 | Tao et al. |
| 8,447,025 B2 | 5/2013 | Shaffer et al. |
| 8,462,670 B2 | 6/2013 | Chien |
| 8,462,920 B2 | 6/2013 | Gonen et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,510,397 B2 * | 8/2013 | Chapman ............. H04M 3/537 709/206 |
| 8,532,612 B1 * | 9/2013 | Holzhey ............. G06Q 20/123 455/406 |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,694,025 B2 | 4/2014 | Dupray et al. |
| 8,695,077 B1 | 4/2014 | Gerhard et al. |
| 8,728,656 B2 | 5/2014 | Takahashi et al. |
| 8,737,593 B2 | 5/2014 | Lawson et al. |
| 8,737,962 B2 | 5/2014 | Ballai et al. |
| 8,738,051 B2 | 5/2014 | Nowack et al. |
| 8,745,205 B2 | 6/2014 | Anderson et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,545 B2 * | 11/2014 | Jackson ............. H04M 3/53308 370/354 |
| 8,879,547 B2 | 11/2014 | Maes |
| 8,885,639 B1 | 11/2014 | Robbins |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,160,696 B2 | 10/2015 | Wilsher et al. |
| 9,161,296 B2 | 10/2015 | Parsons et al. |
| 9,204,281 B2 | 12/2015 | Ramprasad et al. |
| 9,210,275 B2 | 12/2015 | Lawson et al. |
| 9,225,840 B2 | 12/2015 | Malatack et al. |
| 9,226,217 B2 | 12/2015 | Malatack |
| 9,270,833 B2 | 2/2016 | Ballai et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,456,339 B1 | 9/2016 | Hildner et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,906,651 B2 | 2/2018 | Lawson et al. |
| 10,560,495 B2 | 2/2020 | Lawson et al. |
| 10,694,042 B2 | 6/2020 | Lawson et al. |
| 10,893,078 B2 | 1/2021 | Lawson et al. |
| 10,893,079 B2 | 1/2021 | Lawson et al. |
| 10,986,142 B2 | 4/2021 | Lawson et al. |
| 11,283,843 B2 | 3/2022 | Lawson et al. |
| 2001/0032192 A1 | 10/2001 | Putta et al. |
| 2001/0037254 A1 | 11/2001 | Glikman |
| 2001/0037264 A1 | 11/2001 | Husemann et al. |
| 2001/0038624 A1 | 11/2001 | Greenberg et al. |
| 2001/0043684 A1 | 11/2001 | Guedalia et al. |
| 2001/0049274 A1 | 12/2001 | Degraeve |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0020741 A1 | 2/2002 | Sakaguchi |
| 2002/0025819 A1 | 2/2002 | Cetusic et al. |
| 2002/0032874 A1 | 3/2002 | Hagen et al. |
| 2002/0035539 A1 | 3/2002 | O'Connell |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0070273 A1 | 6/2002 | Fujii |
| 2002/0073206 A1 | 6/2002 | Jawahar et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0138450 A1 | 9/2002 | Kremer |
| 2002/0147913 A1 | 10/2002 | Lun Yip |
| 2002/0165957 A1 | 11/2002 | Devoe et al. |
| 2002/0169988 A1 | 11/2002 | Vandergeest et al. |
| 2002/0176378 A1 | 11/2002 | Hamilton et al. |
| 2002/0176404 A1 | 11/2002 | Girard |
| 2002/0177433 A1 | 11/2002 | Bravo et al. |
| 2002/0184361 A1 | 12/2002 | Eden |
| 2002/0198941 A1 | 12/2002 | Gavrilescu et al. |
| 2003/0005136 A1 | 1/2003 | Eun |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0065739 A1 | 4/2003 | Shnier |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0126076 A1 | 7/2003 | Kwok et al. |
| 2003/0149721 A1 | 8/2003 | Alfonso-nogueiro et al. |

(56) References Cited

U.S. PATENT DOCUMENTS

| | | |
|---|---|---|
| 2003/0159068 A1 | 8/2003 | Halpin et al. |
| 2003/0162506 A1 | 8/2003 | Toshimitsu et al. |
| 2003/0169881 A1 | 9/2003 | Niedermeyer |
| 2003/0172272 A1 | 9/2003 | Ehlers et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0204756 A1 | 10/2003 | Ransom et al. |
| 2003/0211842 A1 | 11/2003 | Kempf et al. |
| 2003/0221125 A1 | 11/2003 | Rolfe |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0054632 A1 | 3/2004 | Remy |
| 2004/0071275 A1 | 4/2004 | Bowater et al. |
| 2004/0073519 A1 | 4/2004 | Fast |
| 2004/0097217 A1 | 5/2004 | Mcclain |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0122685 A1 | 6/2004 | Bunce |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0203595 A1 | 10/2004 | Singhal |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0219904 A1 | 11/2004 | De |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0066179 A1 | 3/2005 | Seidlein |
| 2005/0083907 A1 | 4/2005 | Fishler |
| 2005/0091282 A1* | 4/2005 | Whitfield ............ G06K 9/2063 |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0176449 A1 | 8/2005 | Cui et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0273442 A1 | 12/2005 | Bennett et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0020799 A1 | 1/2006 | Kemshall |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0095526 A1* | 5/2006 | Levergood ............ G06Q 30/06 709/206 |
| 2006/0095575 A1 | 5/2006 | Sureka et al. |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168126 A1 | 7/2006 | Costa-Requena et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0027775 A1 | 2/2007 | Hwang |
| 2007/0036127 A1 | 2/2007 | Roosen et al. |
| 2007/0036143 A1 | 2/2007 | Alt et al. |
| 2007/0038499 A1 | 2/2007 | Margulies et al. |
| 2007/0042755 A1 | 2/2007 | Singhal |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0094095 A1 | 4/2007 | Kilby |
| 2007/0107048 A1 | 5/2007 | Halls et al. |
| 2007/0112574 A1 | 5/2007 | Greene |
| 2007/0112673 A1 | 5/2007 | Protti |
| 2007/0116191 A1 | 5/2007 | Bermudez et al. |
| 2007/0121651 A1 | 5/2007 | Casey et al. |
| 2007/0124536 A1 | 5/2007 | Carper |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0168228 A1 | 7/2007 | Lawless |
| 2007/0171898 A1* | 7/2007 | Salva ................ H04L 65/1006 370/356 |
| 2007/0186002 A1 | 8/2007 | Campbell et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |

(56) References Cited

U.S. PATENT DOCUMENTS

| | | |
|---|---|---|
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0049623 A1 | 2/2008 | Qiu et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0165942 A1 | 7/2008 | Provenzale et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0267117 A1 | 10/2008 | Stern |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 1/2009 | Babaev |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0086951 A1 | 4/2009 | Geppert et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0106829 A1 | 4/2009 | Thoursie et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0154451 A1 | 6/2009 | Ku et al. |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0228967 A1 | 9/2009 | Gbadegesin et al. |
| 2009/0232289 A1 | 9/2009 | Drucker et al. |
| 2009/0234965 A1 | 9/2009 | Viveganandhan et al. |
| 2009/0235329 A1 | 9/2009 | Chavez et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0153862 A1 | 6/2010 | Schreiber |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0238688 A1 | 9/2011 | Mercuri et al. |
| 2011/0251921 A1 | 10/2011 | Kassaei et al. |
| 2011/0253693 A1 | 10/2011 | Lyons et al. |
| 2011/0255447 A1 | 10/2011 | Li et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |

(56) References Cited

U.S. PATENT DOCUMENTS

| | | |
|---|---|---|
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0028251 A1 | 1/2013 | Lawson et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0035078 A1* | 2/2013 | Skog ............... G06Q 30/02 455/414.1 |
| 2013/0035427 A1 | 2/2013 | Kimura et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0128882 A1 | 5/2013 | Lawson et al. |
| 2013/0128883 A1 | 5/2013 | Lawson et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0246944 A1 | 9/2013 | Pandiyan et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0098809 A1 | 4/2014 | Lawson et al. |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0037251 A1 | 12/2014 | Fausak et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0001758 A1 | 1/2016 | Sugio |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2016/0366193 A1 | 12/2016 | Lawson et al. |
| 2017/0134443 A1 | 5/2017 | Lawson et al. |

(56) References Cited

U.S. PATENT DOCUMENTS

| | | | |
|---|---|---|---|
| 2017/0134587 A1 | 5/2017 | Lawson et al. | |
| 2017/0339283 A1 | 11/2017 | Chaudhary et al. | |
| 2018/0131813 A1 | 5/2018 | Lawson et al. | |
| 2018/0139248 A1 | 5/2018 | Lawson et al. | |
| 2019/0114676 A1* | 4/2019 | Jain | G06Q 30/0243 |
| 2019/0149582 A1 | 5/2019 | Lawson et al. | |
| 2019/0034941 A1 | 11/2019 | Lawson et al. | |
| 2019/0349409 A1 | 11/2019 | Lawson et al. | |
| 2020/0236220 A1 | 7/2020 | Lawson et al. | |
| 2021/0021652 A1 | 1/2021 | Lawson et al. | |
| 2021/0326935 A1* | 10/2021 | Buchalter | G06Q 30/0276 |
| 2021/0409456 A1 | 12/2021 | Lawson et al. | |
| 2021/0409457 A1 | 12/2021 | Lawson et al. | |
| 2021/0409458 A1 | 12/2021 | Lawson et al. | |

FOREIGN PATENT DOCUMENTS

| | | |
|---|---|---|
| CA | 2720398 A1 | 10/2009 |
| CA | 2720398 C | 8/2016 |
| CN | 1653790 A | 8/2005 |
| CN | 102027721 A | 4/2011 |
| CN | 104902113 A | 9/2015 |
| DE | 1684587 A1 | 3/1971 |
| EP | 0282126 A2 | 9/1988 |
| EP | 1168766 A2 | 1/2002 |
| EP | 1387239 A2 | 2/2004 |
| EP | 1464418 A1 | 10/2004 |
| EP | 1522922 A2 | 4/2005 |
| EP | 1770586 A1 | 4/2007 |
| EP | 2053869 A1 | 4/2009 |
| EP | 2266269 A1 | 12/2010 |
| EP | 2266269 B1 | 1/2019 |
| ES | 2134107 A1 | 9/1999 |
| GB | 2362489 A | 11/2001 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-0131483 A2 | 5/2001 |
| WO | WO-0167219 A1 | 9/2001 |
| WO | WO-0219593 A2 | 3/2002 |
| WO | WO-0235486 A1 | 5/2002 |
| WO | WO-02052879 A1 | 7/2002 |
| WO | WO-2002087804 A1 | 11/2002 |
| WO | WO-03063411 A1 | 7/2003 |
| WO | WO-2004092867 A2 | 10/2004 |
| WO | WO-2005041526 A1 | 5/2005 |
| WO | WO-2006020975 A9 | 4/2006 |
| WO | WO-2006037492 A1 | 4/2006 |
| WO | 2007129225 | 11/2007 |
| WO | WO-2007147151 A2 | 12/2007 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 16/247,214, Notice of Allowance dated Dec. 22, 2020", 10 pgs.
"European Application Serial No. 18215851.9, Response filed Jan. 6, 2021 to Communication Pursuant to Article 94(3) EPC dated Jun. 24, 2020", 10 pgs.
"U.S. Appl. No. 16/845,029, Non Final Office Action dated Mar. 18, 2021", 30 pgs.
"U.S. Appl. No. 16/845,029, Response filed Jun. 17, 2021 to Non Final Office Action dated Mar. 18, 2021", 12 pgs.
"[Proposed] Order Granting Defendant Telesign Corporation's Motion To Dismiss", *Twilio, Inc., v. Telesign Corporation*, Case No. 5:16-cv-6925-LHK, Filed Jan. 25, 2017, 2 pgs.
"ActivCard", [Online]. Retrieved from the Internet: <URL: http://www.activcard.com:80/products/client/tokens/token.pdf>, (1998), 26 pgs.
"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
"U.S. Appl. No. 12/417,630, Non Final Office Action dated Apr. 26, 2012", 14 pgs.
"U.S. Appl. No. 12/417,630, Notice of Allowance dated Aug. 30, 2012", 5 pgs.
"U.S. Appl. No. 12/417,630, Preliminary Amendment filed Jan. 22, 2010", 8 pgs.
"U.S. Appl. No. 12/417,630, Response filed Jun. 19, 2012 to Non Final Office Action dated Apr. 26, 2012", 9 pgs.
"U.S. Appl. No. 12/568,646, Advisory Action dated Jul. 5, 2013", 5 pgs.
"U.S. Appl. No. 12/568,646, Final Office Action dated Feb. 14, 2013", 14 pgs.
"U.S. Appl. No. 12/568,646, Non Final Office Action dated Jun. 7, 2012", 15 pgs.
"U.S. Appl. No. 12/568,646, Notice of Allowance dated Aug. 19, 2013", 6 pgs.
"U.S. Appl. No. 12/568,646, Response filed Jun. 14, 2013 to Final Office Action dated Feb. 14, 2013", 13 pgs.
"U.S. Appl. No. 12/568,646, Response filed Jul. 24, 2013 to Advisory Action dated Jul. 5, 2013", 8 pgs.
"U.S. Appl. No. 12/568,646, Response filed Oct. 19, 2012 to Non Final Office Action dated Jun. 7, 2012", 11 pgs.
"U.S. Appl. No. 13/632,798, Final Office Action dated Jun. 25, 2014", 7 pgs.
"U.S. Appl. No. 13/743,078, Examiner Interview Summary dated Apr. 2, 2014", 4 pgs.
"U.S. Appl. No. 13/743,078, Examiner Interview Summary dated Sep. 5, 2013", 3 pgs.
"U.S. Appl. No. 13/743,078, Final Office Action dated Nov. 29, 2013", 13 pgs.
"U.S. Appl. No. 13/743,078, Non Final Office Action dated May 9, 2013", 13 pgs.
"U.S. Appl. No. 13/743,078, Notice of Allowance dated Apr. 22, 2014", 8 pgs.
"U.S. Appl. No. 13/743,078, Response filed Mar. 28, 2014 to Final Office Action dated Nov. 29, 2013", 4 pgs.
"U.S. Appl. No. 13/743,078, Response filed Aug. 9, 2013 to Non Final Office Action dated May 9, 2013", 7 pgs.
"U.S. Appl. No. 13/743,080, Examiner Interview Summary dated Apr. 21, 2014", 3 pgs.
"U.S. Appl. No. 13/743,080, Examiner Interview Summary dated Sep. 9, 2013", 3 pgs.
"U.S. Appl. No. 13/743,080, Final Office Action dated Dec. 18, 2013", 11 pgs.
"U.S. Appl. No. 13/743,080, Non Final Office Action dated May 13, 2013", 12 pgs.
"U.S. Appl. No. 13/743,080, Notice of Allowance dated May 9, 2014", 7 pgs.
"U.S. Appl. No. 13/743,080, Response filed Apr. 17, 2014 to Final Office Action dated Dec. 18, 2013", 10 pgs.
"U.S. Appl. No. 13/743,080, Response filed Aug. 12, 2013 to Non Final Office Action dated May 13, 2013", 12 pgs.
"U.S. Appl. No. 14/103,632, Examiner Interview Summary dated Mar. 20, 2015", 3 pgs.
"U.S. Appl. No. 14/103,632, Examiner Interview Summary dated Mar. 31, 2015", 3 pgs.
"U.S. Appl. No. 14/103,632, Examiner Interview Summary dated Nov. 5, 2015", 3 pgs.
"U.S. Appl. No. 14/103,632, Examiner Interview Summary dated Dec. 22, 2014", 2 pgs.
"U.S. Appl. No. 14/103,632, Non Final Office Action dated Mar. 17, 2014", 4 pgs.
"U.S. Appl. No. 14/103,632, Non Final Office Action dated Jul. 30, 2015", 22 pgs.

(56) References Cited

OTHER PUBLICATIONS

"U.S. Appl. No. 14/103,632, Non Final Office Action dated Oct. 10, 2014", 16 pgs.
"U.S. Appl. No. 14/103,632, Notice of Allowability dated Dec. 7, 2015", 2 pgs.
"U.S. Appl. No. 14/103,632, Notice of Allowance dated Nov. 20, 2015", 5 pgs.
"U.S. Appl. No. 14/103,632, Response filed Apr. 9, 2015 to Non Final Office Action dated Oct. 10, 2014", 16 pgs.
"U.S. Appl. No. 14/103,632, Response filed Jun. 17, 2014 to Non Final Office Action dated Mar. 17, 2014", 8 pgs.
"U.S. Appl. No. 14/103,632, Response filed Oct. 30, 2015 to Non Final Office Action dated Jul. 30, 2015", 12 pgs.
"U.S. Appl. No. 14/459,615, Non Final Office Action dated Feb. 2, 2016", 8 pgs.
"U.S. Appl. No. 14/459,615, Notice of Allowance dated Jun. 8, 2016", 7 pgs.
"U.S. Appl. No. 14/459,615, Response filed Apr. 28, 2016 to Non Final Office Action dated Feb. 2, 2016", 10 pgs.
"U.S. Appl. No. 15/245,456, Notice of Allowance dated Oct. 21, 2016", 13 pgs.
"U.S. Appl. No. 15/412,933, Notice of Allowance dated Oct. 13, 2017", 11 pgs.
"U.S. Appl. No. 15/412,933, Preliminary Amendment filed Feb. 21, 2017", 6 pgs.
"U.S. Appl. No. 15/413,660, Non Final Office Action dated Mar. 13, 2017", 7 pgs.
"U.S. Appl. No. 15/413,660, Notice of Allowance dated Oct. 11, 2017", 9 pgs.
"U.S. Appl. No. 15/413,660, Notice of Allowance dated Nov. 3, 2017", 6 pgs.
"U.S. Appl. No. 15/413,660, Notice of Allowance dated Dec. 14, 2017", 2 pgs.
"U.S. Appl. No. 15/413,660, Notice of Non-Compliant Amendment dated Jun. 19, 2017", 2 pgs.
"U.S. Appl. No. 15/413,660, Preliminary Amendment filed Feb. 23, 2017", 8 pgs.
"U.S. Appl. No. 15/413,660, Response filed Jun. 12, 2017 to Non Final Office Action dated Mar. 13, 2017", 8 pgs.
"U.S. Appl. No. 15/413,660, Response filed Jun. 22, 2017 to Notice of Non-Compliant Amendment dated Jun. 19, 2017", 8 pgs.
"U.S. Appl. No. 15/868,796, Advisory Action dated Feb. 4, 2020", 3 pgs.
"U.S. Appl. No. 15/868,796, Examiner Interview Summary dated Feb. 24, 2020", 3 pgs.
"U.S. Appl. No. 15/868,796, Examiner Interview Summary dated Aug. 2, 2019", 3 pgs.
"U.S. Appl. No. 15/868,796, Final Office Action dated Nov. 15, 2019", 6 pgs.
"U.S. Appl. No. 15/868,796, Non Final Office Action dated May 3, 2019", 20 pgs.
"U.S. Appl. No. 15/868,796, Notice of Allowance dated Feb. 27, 2020", 10 pgs.
"U.S. Appl. No. 15/868,796, Response filed Jan. 15, 2020 to Final Office Action dated Nov. 15, 2019", 11 pgs.
"U.S. Appl. No. 15/868,796, Response filed Aug. 5, 2019 to Non-Final Office Action dated May 3, 2019", 12 pgs.
"U.S. Appl. No. 15/871,794, Non Final Office Action dated May 13, 2019", 11 pgs.
"U.S. Appl. No. 15/871,794, Notice of Allowance dated Feb. 4, 2019", 8 pgs.
"U.S. Appl. No. 15/871,794, Notice of Allowance dated Oct. 9, 2018", 8 pgs.
"U.S. Appl. No. 15/871,794, Notice of Allowance dated Oct. 23, 2019", 8 pgs.
"U.S. Appl. No. 15/871,794, Response filed Sep. 5, 2019 to Non-Final Office Action dated May 13, 2019", 11 pgs.
"U.S. Appl. No. 16/247,214, Examiner Interview Summary dated Sep. 1, 2020", 3 pgs.
"U.S. Appl. No. 16/247,214, Non Final Office Action dated Jun. 18, 2020", 15 pgs.
"U.S. Appl. No. 16/247,214, Response filed Sep. 17, 2020 to Non Final Office Action dated Jun. 18, 2020", 13 pgs.
"U.S. Appl. No. 16/520,190, Non Final Office Action dated Jun. 22, 2020", 6 pgs.
"U.S. Appl. No. 16/520,190, Notice of Allowance dated Aug. 26, 2020", 7 pgs.
"U.S. Appl. No. 16/520,190, Response filed Aug. 17, 2020 to Non Final Office Action dated Jun. 22, 2020", 7 pgs.
"U.S. Appl. No. 16/520,195, Non Final Office Action dated Jun. 22, 2020", 6 pgs.
"U.S. Appl. No. 16/520,195, Notice of Allowance dated Sep. 16, 2020", 7 pgs.
"U.S. Appl. No. 16/520,195, Response filed Aug. 17, 2020 to Non Final Office Action dated Jun. 22, 2-020", 7 pgs.
"Archive Microsoft Office 365 Email | Retain Unified Archiving", GWAVA, Inc., Montreal, Canada, [Online] Retrieved from the Internet: <URL: http://www.gwava.com/Retain/Retain for_Office_365.php>, (2015), 4 pgs.
"ASB Bank selects RSA Mobile two-factor authentication for Internet security; Leading New Zealand bank to integrate RSA Mobile solution to expand business opportunities and enhance", RSA Security, M2 Presswire; Coventry [Coventry], (Jun. 23, 2003), 4 pgs.
"Australian Application Serial No. 2009231676, First Examiner Report dated Jan. 15, 2013", 3 pgs.
"Australian Application Serial No. 2009231676, Response filed Aug. 14, 2013 to First Examiner Report dated Jan. 15, 2013", 17 pgs.
"Authenex", [Online]. Retrieved from the Internet: <URL: http://www.authenex.com:80/isaserver/pdf/psasas.pdf>, (2003), 34 pgs.
"Aventail partners with phone-based two-factor authentication company; Aventail and SecurEnvoy join forces to offer easy-to-use authentication from mobile devices for secure, remote access", Aventail—M2 Presswire; Coventry [Coventry], (Dec. 7, 2005), 4 pgs.
"Canadian Application Serial No. 2,720,398, Office Action dated May 4, 2015", 4 pgs.
"Canadian Application Serial No. 2,720,398, Response filed Nov. 3, 2015 to Office Action dated May 4, 2015", 11 pgs.
"Carrierinfo—Product Guide", MapInfo Corporation, (2005), 36 pgs.
"CDyne Phone Verifier", Background_Web_Archive, (2005), 4 pgs.
"Chinese Application Serial No. 200980116961.6, Office Action dated Jul. 17, 2014", W/O English Translation, 3 pgs.
"Chinese Application Serial No. 201510204607.6, Office Action dated Jan. 12, 2018", W/English Translation, 8 pgs.
"Chinese Application Serial No. 201510204607.6, Office Action dated May 24, 2017", W/English Translation, 9 pgs.
"Classifying m-payments—a user-centric model", Proceedings of the Third International Conference on Mobile Business, M-Business, (2004), 11 pgs.
"Complaint for Patent Infringement", *Telinit Technologies, LLC* v. *Twilio Inc* 2:12-cv-663, (Oct. 12, 2012), 17 pgs.
"Complaint for Patent Infringement—Jury Trial Demanded", *Twilio Inc.*, vs. *Telesign Corporation*, Case 3:16-cv-06925 Filed Dec. 1, 2016, 240 pgs.
"CRYPTO—Tokens", CryptoCard, (2003), 12 pgs.
"Cyber Locator", (1999), 7 pgs.
"Declaration of Jesse J. Camacho in Support of Defendant Telesign Corporation's Reply To Motion To Dismiss", *Twilio, Inc.*, v. *Telesign Corporation*, Case No. 5:16-cv-6925-LHK, Filed Feb. 15, 2017, 17 pgs.
"Defendant Telesign Corporation's Notice of Motion and Motion To Dismiss; Memorandum of Points and Authorities in Support Thereof", *Twilio, Inc.*, v. *Telesign Corporation*, Case No. 5:16-cv-6925-LHK, Filed Jan. 25, 2017, 32 pgs.
"Defendant Telesign Corporation's Reply in Support of Motion To Dismiss", *Twilio, Inc.*, v. *Telesign Corporation*, Case No. 5:16-cv-6925-LHK, Filed Feb. 15, 2017, 22 pgs.
"DIGIPASS® GO 1", Vasco, (2001), 36 pgs.
"Diversinet", MobiSecure, 2 pgs.

(56) References Cited

OTHER PUBLICATIONS

"Entrust", Entrust TruePass™ Product Portfolio, 28 pgs.
"Ethernet to Token Ring Bridge", Biack Box Corporation, [Online] Retrieved from the Internet: <URL: http://blackboxcanada.com/resource/files/productdetails/17044.pdf>, (Oct. 1999), 2 pgs.
"eToken", Aladdin Knowledge Systems, [Online], Retrieved from the Internet: <URL: http://www.aladdin.com:80/etoken/products.asp>, (2005), 20 pgs.
"European Application Serial No. 09726505.2, Communication Pursuant to Article 94(3) EPC dated Jan. 23, 2018", 5 pgs.
"European Application Serial No. 09726505.2, Extended European Search Report dated Oct. 30, 2013", 7 pgs.
"European Application Serial No. 09726505.2, Intention to Grant dated Jul. 20, 2018", 56 pgs.
"European Application Serial No. 09726505.2, Response filed May 10, 2018 to Communication pursuant to Article 94(3) EPC dated Jan. 23, 2018", 73 pgs.
"European Application Serial No. 09726505.2, Response filed May 12, 2014 to Extended European Search Report dated Oct. 30, 2013", 13 pgs.
"European Application Serial No. 18215851.9, Communication Pursuant to Article 94(3) EPC dated Jun. 24, 2020", 4 pgs.
"European Application Serial No. 18215851.9, Extended European Search Report dated Apr. 2, 2019", 7 pgs.
"European Application Serial No. 18215851.9, Response filed Oct. 30, 2019 to Extended European Search Report dated Apr. 2, 2019", 15 pgs.
"File History U.S. Pat. No. 8,351,369", 295 pgs.
"File History U.S. Pat. No. 8,462,920 B2", 322 pgs.
"File History U.S. Pat. No. 8,737,593", 261 pgs.
"File History U.S. Pat. No. 8,755,376 B2", 1084 pgs.
"Final Written Decision 35 U.S.C. § 318(a)", *Telesign Corporation v. Twilio Inc.*, Case IPR2017-01976, U.S. Pat. No. 8,837,465B2, (Mar. 6, 2019), 42 pgs.
"Final Written Decision 35 U.S.C. § 318(a)", *Telesign Corporation v. Twilio Inc.*, Case IPR2017-01977, U.S. Pat. No. 8,755,376B2, (Mar. 6, 2019), 51 pgs.
"iKey 2032", Personal USB Authentication and Encryption Token, [Online] Retrieved from the Internet: <URL: http://www.safenet-inc.com:80/library/3/iKey_2032.pdf>, (2005), 5 pgs.
"Indian Application Serial No. 7232/DELNP/2010, First Examiner Report dated May 4, 2018", 8 pgs.
"International Application Serial No. PCT/US2009/039371, International Preliminary Report on Patentability dated Oct. 14, 2010", 7 pgs.
"International Application Serial No. PCT/US2009/039371, International Search Report dated Jul. 14, 2009", 2 pgs.
"International Application Serial No. PCT/US2009/039371, Written Opinion dated Jul. 14, 2009", 5 pgs.
"Fone Finder", (Feb. 4, 2005), 12 pgs.
"International Application Serial No. PCT/US2009/058671, International Preliminary Report on Patentability dated Apr. 7, 2011", 6 pgs.
"International Application Serial No. PCT/US2009/058671, International Search Report dated Dec. 30, 2009", 2 pgs.
"International Application Serial No. PCT/US2009/058671, Written Opinion dated Dec. 30, 2009", 4 pgs.
"International Numbering Plans", Background_Web_Archive, (2005), 1 pg.
"Maag Holdings Selects RSA Security to Help Protect its Real Estate Information System", (2003), 5 pgs.
"Microsoft Targets Mobile Developers with Tools and Devices", Mobile Business Advisor, (2003), 1 pg.
"Multi-Factor Authentication Employing Voice Biometrics and Existing Infrastructures", Background_Web_Archive_Authentify, (2005), 15 pgs.
"Open Service Access (OSA); Parlay X Web Services; Part 11: Audio Call (Parlay X 2)", ETSI ES 202 391-11 V1.2.1, (Dec. 2006), 19 pgs.
"Open Service Access (OSA); Parlay X Web Services; Part 2: Third Party Call (Parlay X 2)", ETSI ES 202 391-2 V1.2.1, (Dec. 2006), 18 pgs.
"Open Service Access (OSA); Parlay X Web Services; Part 3: Call Notification (Parlay X 2)", ETSI ES 202 391-3 V1.2.1, (Dec. 2006), 23 pgs.
"Open Service Access (OSA); Parlay X Web Services; Part 4: Short Messaging (Parlay X 2)", ETSI ES 202 391-4 V1.2.1, (Dec. 2006), 26 pgs.
"Open Service Access (OSA); Parlay X Web Services; Part 7: Account Management (Parlay X 2)", ETSI ES 202 391-7 V1.2.1, (Dec. 2006), 22 pgs.
"Order Granting in Part and Denying in Part Defendant's Motion To Dismiss", *Twilio, Inc., v. Telesign Corporation*, Case No. 16-CV-06925-LHK, Re: Dkt. No. 31, Filed Mar. 31, 2017, 58 pgs.
"Order Granting in Part Defendant's Motion To Dismiss", *Twilio, Inc., v. Telesign Corporation*, Case No. 16-CV-06925-LHK, Re: Dkt. No. 31, Filed Apr. 17, 2017, 54 pgs.
"PhoneID Fraud Prevention", Delivers real-time security intelligence and data on phone numbers around the world to enable greater assurance and security against fraudulent activity, (Jun. 15, 2015), 7 pgs.
"PhoneID Score", PhoneID Score—TeleSign REST API v1.50 documentation, (Jun. 16, 2015), 10 pgs.
"PhoneID Standard", PhoneID Standard—TeleSign REST API v1.50 documentation, (Jun. 16, 2015), 1-10.
"Plaintiff's Opposition To Defendant's Motion To Dismiss", *Twilio Inc., vs. Telesign Corporation*, Case No. 5:16-CV-06925-LHK, Filed Feb. 8, 2017, 28 pgs.
"Q3 2002 RSA Security Earnings Conference Call—Final", Dow Jones, (Oct. 16, 2002), 12 pgs.
"Q4 2002 RSA Security Earnings Conference Call—Final", Dow Jones, (Jan. 23, 2003), 8 pgs.
"Requests", TeleSign REST API v1.51 documentation, (Nov. 3, 2015), 1 pg.
"Resources", TeleSign REST API v1.51 documentation, (Nov. 2, 2015), 2 pgs.
"Responses", TeleSign REST API v1.51 documentation, (Nov. 3, 2015), 1 pg.
"Risk factor put on hold—Security Solutions—Data Under Siege—A special advertising report", The Australian—Dow Jones, (Sep. 24, 2002), 1 pg.
"RSA launches authentication solutions", The China Post—Dow Jones, (Sep. 14, 2002), 2 pgs.
"RSA Mobile", Two-factor authentication for a mobile world, (Jun. 12, 2004), 6 pgs.
"RSA Mobile New Product Review", (2002), 1 pg.
"RSA SecurID® Authentication", A Better Value for a Better ROI, (2003), 34 pgs.
"RSA Security and iRevolution Join Forces to Offer Two-Factor Authentication For Companies Using Microsoft(R) Passport", PR Newswire; New York, (Oct. 8, 2002), 4 pgs.
"RSA Security and Nocom launch new service in Scandinavia: Flexible and secure solution for user identification", NASDAQ OMX—Dow Jones, (Sep. 9, 2003), 2 pgs.
"RSA Security Announces Third Quarter Results", PR Newswire—Dow Jones, (Oct. 16, 2002), 10 pgs.
"RSA Security Helps Banca Popolare di Sondrio (Suisse) Differentiate Itself from the Competition", PR Newswire; New York, (Apr. 15, 2003), 4 pgs.
"RSA Security technology helps make an innovative information management solution even more compelling to the marketplace", Maag Holdings Ltd., (2004), 3 pgs.
"RSA Security Unveils Innovative Two-Factor Authentication Solution for the Consumer Market", PR Newswire; New York, (Sep. 4, 2002), 5 pgs.
"RSA Security uses phones as security token. (Business)", RCR Wireless News. 21.36, Academic OneFile, [Online] Retrieved from the Internet: <http://link.galegroup.com/apps/doc/A91672329/AONE?u=otta35732&sid=AONE&xid=2f576581>, (Sep. 9, 2002), 1 pg.
"RSA(R) Mobile and RSA SecurID(R) Two-Factor Authentication Products Recognized by SC Magazine as Best of 2002", PR Newswire—Dow Jones, (Dec. 12, 2002), 2 pgs.

(56) References Cited

OTHER PUBLICATIONS

"Saintlogin", Background_Web_Archive, (2005), 3 pgs.
"score()—TeleSign Python SDK documentation", score(), (Jun. 16, 2015), 2 pgs.
"Scottrade Selects PassMark for Strong Mutual Authentication", PassMark, (Oct. 11, 2005), 8 pgs.
"SecurAccess Overview Video", Securenvoy—Date for Overview.swf, [Online], [Accessed Jan. 20, 2005], Retrieved from the Internet: <URL: www.securenvoy.com/animations/Overview.swf>, 14 pgs.
"SecurAccess User Guide Video", Securenvoy—Date for UserGuide.swf, [Online]. [Accessed Sep. 30, 2004], Retrieved from the Internet: <URL: http://www.securenvoy.com/animations/UserGuide.swf>, 17 pgs.
"SecurAccess Video", Securenvoy—Date for SecurAccess.swf, [Online]. [Accessed May 5, 2006], Retrieved from the Internet: <URL: http://www.securenvoy.com:80/animations/SecurAccess.swf>, 8 pgs.
"Securenvoy", Secure Email, (2004), 6 pgs.
"SecurEnvoy SecurAccess", Protecting Access from outside the perimeter, (2005), 6 pgs.
"SecurMail and SecurAccess", Securenvoy, 1 pg.
"SIEMENS", System Description HiPath 3000 Version 1.2-3.0, (2002), 762 pgs.
"Simple, secure access control for the Web", using SafeWord™ PremierAccess, (Nov. 2001), 46 pgs.
"Smart Verify | TeleSign", Smart Verify, (Nov. 3, 2015), 9 pgs.
"SMS Authentication", RSA Security Inc. Published in ComputerWorld Sep. 23, 2002, Technology, p. 38, (Sep. 23, 2002), 1 pg.
"SMS Verify—TeleSign", SMS Verify, (Nov. 3, 2015), 8 pgs.
"Taking security online to new level", Dow Jones, (2005), 2 pgs.
"TeleSign's PhoneID Score Named a New Products Winner", TeleSign, (Jun. 27, 2014), 4 pgs.
"Trailblazers: RSA Security (specializes in access management tools for internal security)", Dow Jones, (2003), 1 pg.
"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.
"Unified Authentication", Verisign, (Mar. 21, 2005), 196 pgs.
"Verify Registration—TeleSign REST API v1.51 documentation", Verify Registration, (Nov. 3, 2015), 7 pgs.
"Voice Verify With Call Forward Detection", TeleSign Verification APIs, (2015), 2 pgs.
"What's a Mobile Phone, anyway?", Australian PC World; Off Camera Fun, (Jun. 2005), 1 pg.
"Wifi WatchDog", Newbury Networks, (2006), 11 pgs.
Abu-Lebdeh, et al., "A 3GPP Evolved Packet Core-Based Architecture for QoS-Enabled Mobile Video Surveillance Applications", 2012 Third International Conference on the Network of the Future {NOF}, (Nov. 21-23, 2012), 1-6.
Barakovic, Sabina, et al.,, "Survey and Challenges of QoE Management Issues in Wireless Networks", Hindawi Publishing Corporation, (2012), 1-29.
Bennett, Robert, "American business has to start thinking of data with the same reverence that it thinks of money!", Griffin Technologies, LLC. White Paper, (Oct. 2001), 6 pgs.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Curphey, Mark, et al., "A Guide to Building Secure Web Applications: The Open Web Application Security Project!", (2002), 70 pgs.
Doyle, Eric, "RSA uses SMS to offer secure Web access anywhere", (2002), 1 pg.
Fonseca, Brian, "RSA and Entrust target Web services security returns", Dow Jones, (Oct. 8, 2002), 2 pgs.
Forbes, Bob, "The Fifth Factor: Behavior Profiling Opens New Possibilities For Web Access Control", Data Security Management, 8 pgs.

Fred, Piper, et al., "Identities and authentication", Cyber Trust & Crime Prevention Project, (Apr. 6, 2004), 1-15.
Hill, Kashmir, "Your Phone Number Is Going To Get A Reputation Score Forbes", Forbes, (Jun. 16, 2015), 4 pgs.
Hong, Sungjune, et al., "The semantic PARLAY for 4G network", 2nd International Conference on Mobile Technology, Applications and Systems. IEEE, (2005), 5 pgs.
Jamieson, Rodger, et al., "A Framework for Security, Control and Assurance of Knowledge Management Systems", School of Information Systems, Technology and Management, University of New South Wales, Sydney, Australia, Chapter 25, (2004), 29 pgs.
Jones, Dow, "Awakens To The Fact That Prevention Is Better Than Cure", India Inc., (Mar. 31, 2003), 1 pg.
Jones, Dow, "Event Brief of Q3 2002 RSA Security Earnings Conference Call—Final", (Oct. 16, 2002), 5 pgs.
Jones, Dow, "Make sure you're secure", Bristol Evening Post, (Oct. 25, 2004), 2 pgs.
Jones, Dow, "Regulatory News Service (RNS)", REG-iRevolution Group Announces Partnership, (Oct. 9, 2002), 2 pgs.
Jörg, Tacke, et al., "Two-Factor Web Authentication Via Voice", Voice.Trust AG1, (2003), 88 pgs.
Kemshall, A., et al., "Two Factor Authentication", securenvoy, White Paper, (2005), 8 pgs.
Kim, Hwa-Jong, et al., "In-Service Feedback QoE Framework", 2010 Third International Conference on Communication Theory, Reliability and Quality of Service, (2010), 135-138.
Kotanchik, J, "Kerberos And Two-Factor Authentication", (Mar. 1994), 6 pgs.
Kumar, Bharat, et al., "Breaking into Cyberia", Business Line, Dow Jones, (Nov. 5, 2003), 4 pgs.
Lebihan, Rachel, "New online banking security plan in doubt", The Australian Financial Review, Dow Jones, (Aug. 2, 2004), 2 pgs.
Lebihan, Rachel, "Still Fishing For Answer To Internet Scams", The Australian Financial Review, Dow Jones, (2004), 3 pgs.
Louise, Richardson, "RSA Security", Dow Jones, (Dec. 1, 2003), 2 pgs.
Mallery, John, "Who Are You? You just can't trust a username/password combo to verify user identity. It's time for two-factor", Security Technology & Design, (Nov. 1, 2005), 4 pgs.
Matos, et al., "Quality of Experience-based Routing in Multi-Service Wireless Mesh Networks", Realizing Advanced Video Optimized Wireless Networks. IEEE, (2012), 7060-7065.
Mccue, Andy, "Networks—ISP trials security via SMS", Computing, (Sep. 12, 2002), 1 pg.
Mccue, Andy, "SMS Secures Online Apps", ITWEEK, Dow Jones, (Sep. 9, 2002), 2 pgs.
Mccue, Andy, "United Utilities pilots SMS security software", VNUnet Newswire, Dow Jones, (Sep. 4, 2002), 2 pgs.
Messmer, Ellen, "HIPAA deadline ups healthcare anxiety", Network World, (Mar. 10, 2003), 1 pg.
Mills, Kelly, "Security merger to boost banks", The Australian—Dow Jones, (2005), 2 pgs.
Mizuno, Shintaro, et al., "Authentication Using Multiple Communication Channels", (Nov. 11, 2005), 9 pgs.
Mu, Mu, et al., "Quality Evaluation in Peer-to-Peer IPTV Services", Data Traffic and Monitoring Analysis, LNCS 7754, 302-319, (2013), 18 pgs.
Nguyan, Thien-Loc, "National Identification Systems", (Jun. 2003), 156 pgs.
Nystrom, M, "The SecurID(r) SASL Mechanism", RSA Laboratories, (Apr. 2000), 11 pgs.
O'Gorman, "Comparing Passwords, Tokens, and Biometrics for User Authentication", In Proceedings: The IEEE, vol. 91, Issue 12, (Dec. 2003), 20 pgs.
O'Gorman, Lawrence, et al., "Call Center Customer Verification by Query-Directed Passwords", 15 pgs.
Parthasarathy, P R, "Resolving Webuser on the Fly", (Jun. 2002), 6 pgs.
Pullar-Strecker, Tom, "Asb Shuts Out Online Fraud", (Sep. 27, 2004), 2 pgs.
Pullar-Strecker, Tom, "Auckland Security Firm Turns Heads", (May 30, 2005), 3 pgs.

(56) References Cited

OTHER PUBLICATIONS

Pullar-Strecker, Tom, "NZ bank adds security online", (Nov. 8, 2004), 1 pg.

Pullar-Strecker, Tom, et al., "NZ start-up plans authentication trial", (Aug. 23, 2004), 3 pgs.

Scarlet, Pruitt, "RSA secures mobile access to Web apps", Dow Jones—InfoWorld Daily News, (Sep. 4, 2002), 1 pg.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

Tynan, Dan, "What's a Cell Phone, Anyway?", PC World.Com; San Francisco, (Mar. 23, 2005), 3 pgs.

Wall, Matthew, "Fight business marauders the high-tech way", Sunday Times; London (UK), (Sep. 18, 2005), 4 pgs.

Wolfe, Daniel, "For PassMark, Image Is Everything in Phish Foiling", American Banker. 169.43, (Mar. 4, 2004), 2 pgs.

Wright, Rob, "Paramount Protection Vendors have devised new ways to safeguard information", VARbusiness, (Oct. 28, 2002), 4 pgs.

Wu, Min, et al., "Secure Web Authentication with Mobile Phones", DIMACS Workshop on Usable Privacy and Security Software, (Jul. 2004), 5 pgs.

Wullems, Chris, et al., "Enhancing the Security of Internet Applications using location: A New Model for Tamper-resistant GSM Location", Proceedings of the Eighth IEEE International Symposium on Computers and Communication (ISCC'03), (2003), 9 pgs.

"U.S. Appl. No. 16/845,029, Final Office Action dated Sep. 29, 2021", 31 pgs.

"U.S. Appl. No. 16/845,029, Non Final Office Action dated Dec. 21, 2021", 30 pgs.

"U.S. Appl. No. 16/845,029, Response filed Dec. 10, 2021 to Final Office Action dated Sep. 29, 2021", 11 pgs.

"U.S. Appl. No. 17/061,311, Notice of Allowance dated Nov. 9, 2021", 8 pgs.

"European Application Serial No. 18215851.9, Communication Pursuant to Article 94(3) EPC dated Sep. 8, 2021", 6 pgs.

"U.S. Appl. No. 16/845,029, Examiner Interview Summary dated Mar. 9, 2022", 2 pgs.

"U.S. Appl. No. 16/845,029, Response filed Mar. 21, 2022 to Non Final Office Action dated Dec. 21, 2021", 9 pgs.

"European Application Serial No. 18215851.9, Response Filed Mar. 18, 2022 to Communication Pursuant to Article 94(3) EPC dated Sep. 8, 2021", 21 pgs.

"U.S. Appl. No. 16/845,029, Final Office Action dated Apr. 27, 2022", 29 pgs.

* cited by examiner

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIG. 4B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4C

```
GET /foo.php  HTTP/1.1
Host:  demo.twilio.com
X-Twilio-SMSid=DE870AD708ED70AE87D0AE7DAD7
X-Twilio-SMSSenderID=415-555-1212
X-Twilio-SMSShortCode=11111
X-Twilio-AccountId=AAF4AF5AF8A9A885449F7A647AF84
Content-Length:  0
```

FIG. 4D

```
GET /foo.php  HTTP/1.1
Host:  demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length:  21

Message=statusrequest
```

FIG. 4E

```
GET /foo.php?message=statusrequest HTTP/1.1
Host:  demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length:  0
```

FIG. 4F

```
XML Response

<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIG. 5A

```
XML Response

<?xml version="1.0" encoding="UTF-8"?>
<Response>
        <sms address=415-555-555
                thanks for the your text, will call at 5 PM.
        </sms>
        <CallAtTime="17:00PST">
                Today
                <Dial>415-555-5309</Dial>

</CallAtTime>
</Response>
```

FIG. 5B

```
POST /2008-08-01/Accounts/AC309475e5fede1b49e100272a8640f438/Calls HTTP/1.1
        Caller=4155555309&Called=4155551212&Url=http://www.myapp.com/myhandler.php <TwilioResponse>
        <Call>
                <Sid>CA42ed11f93dc08b952027ffbc406d0868</Sid>
                <CallSegmentSid/>
                <AccountSid>AC309475e5fede1b49e100272a8640f438</AccountSid>
                <Called>4155551212</Called>
                <Caller>4155555309</Caller>
                <PhoneNumberSid>PN0123456789012345678900<PhoneNumberSid>
                <Status>0</Status>
                <StartTime>Thu, 03 Apr 2008 04:36:33  -0400</StartTime>
                <EndTime/>
                <Price/>
                <Flags>1</Flags>
        </Call>
</TwilioResponse>
```

SYSTEM AND METHOD FOR PROCESSING TELEPHONY SESSIONS

CROSS-REFERENCE TO RELATED APPLICATIONS

This application is a continuation of U.S. patent application Ser. No. 16/520,195, filed Jul. 23, 2019, which is a continuation of U.S. patent application Ser. No. 16/247,214, filed Jan. 14, 2019, which is a continuation of U.S. patent application Ser. No. 15/871,794, filed Jan. 15, 2018 now issued as U.S. Pat. No. 10,560,495, which is a continuation of U.S. patent application Ser. No. 15/412,933, filed Jan. 23, 2017, now issued as U.S. Pat. No. 9,906,571, which is a continuation of U.S. patent application Ser. No. 15/245,456, filed Aug. 24, 2016, now issued as U.S. Pat. No. 9,596,274, which is a continuation of U.S. patent application Ser. No. 14/459,615, filed Aug. 14, 2014, now issued as U.S. Pat. No. 9,456,008, which is a continuation of U.S. patent application Ser. No. 13/743,080, filed Jan. 16, 2013, now issued as U.S. Pat. No. 8,837,465, which is a continuation of U.S. patent application Ser. No. 13/632,798, filed Oct. 1, 2012, now abandoned, which is a continuation of U.S. patent application Ser. No. 12/417,630, filed Apr. 2, 2009, now issued as U.S. Pat. No. 8,306,021, which claims the benefit of U.S. Provisional Application No. 61/041,829 filed Apr. 2, 2008, U.S. Provisional Application No. 61/055,417 filed on May 22, 2008, U.S. Provisional Application No. 61/100,578 filed on Sep. 26, 2008, U.S. Provisional Application No. 61/156,746 filed on Mar. 2, 2009, and U.S. Provisional Application No. 61/156,751 filed on Mar. 2, 2009, which are all incorporated by reference in their entireties.

TECHNICAL FIELD

This invention relates generally to the telephony field, and more specifically to a new and useful system and method for processing telephony sessions in the telephony field.

BACKGROUND

In the last decade, legislation and the advent of Voice over Internet Protocol (VOIP) have revolutionized the communication industry with new technologies, business models, and service providers. Software and commodity hardware now provide an alternative to expensive carrier equipment. One can implement extensible call switching and voice application logic in Open source software applications, such as Asterisk and FreeSwitch. These new application stacks, however, usher in new complexities and challenges, requiring new skill sets to deploy, develop, and maintain. Deploying telephony services requires knowledge of voice networking and codecs, hardware or services to bridge servers to the public phone infrastructure, capital investment in hardware, and ongoing collocation of that hardware. These burdens are a mere prerequisite to developing the actual application, which requires developers to train in new languages, tools, and development environments. Even telephony applications that currently try to leverage a model more similar to web-development such as Voice Extensible Markup Language (VoiceXML), require the dedication to learn a new language and understand telephony interaction. Ongoing operation and maintenance of these services requires teams to adopt new analysis tools, performance metrics, and debugging methodologies. Developing even the simplest of voice services (such as a so-called "phone tree") requires significant upfront and ongoing investment in specialized infrastructure, skills, and operations. Thus, there is a need in the telephony field to create a new and useful system and method for processing telephony sessions. This invention provides such a new and useful system and method.

SUMMARY

The method of the preferred embodiment for processing telephony sessions include the steps of communicating with an application server using an application layer protocol, processing telephony instructions with a call router, and creating call router resources accessible through an Application Programming Interface (API). The method and system of the preferred embodiments enables web developers to use their existing skills and tools with the esoteric world of telephony, making telephony application development as easy as web programming. The method and system use the familiar web site visitor model to interact with a web developer's application, with each step of the phone call analogous to a traditional page view. Within this model, developers reuse their existing tools and techniques, including familiar concepts such as HTTP redirects, accessing resources through an API, cookies, and mime-type responses to construct complex telephony applications. The method of processing telephony instructions and creating call router resources accessible through an API (a call router API) cooperatively function to enable a stateless and simple telephony language with more call router resources and information provided through the call router (preferably a REST API as is familiar to many web developers). In one embodiment, the telephony instructions set may have fewer than dozen verbs, simplifying the language so that developers can quickly learn and implement telephony applications, while the call router API compliments the simple telephony instructions to enable complex telephony applications.

BRIEF DESCRIPTION OF THE FIGURES

FIGS. 4A-4C are examples of a HTTP GET request, a HTTP POST request, and a HTTP GET request, respectively.

FIGS. 4D-4F are examples of a HTTP requests.

FIGS. 5A and 5B are examples of XML responses.

FIG. 6 is an example of a call Router request and response.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Processing Telephony Sessions

As shown in FIGS. 1, 2A, 2B, 3A, and 3B, the method 10 of the preferred embodiment for processing telephony sessions include the steps of communicating with an application server using an application layer protocol S110, processing telephony instructions with a call router S120, and creating call router resources accessible through an Application Programming Interface (API) S130. The preferred method may also include other steps and/or sub-steps, as explained below.

1A. Communicating with an Application Server

Figure 1:
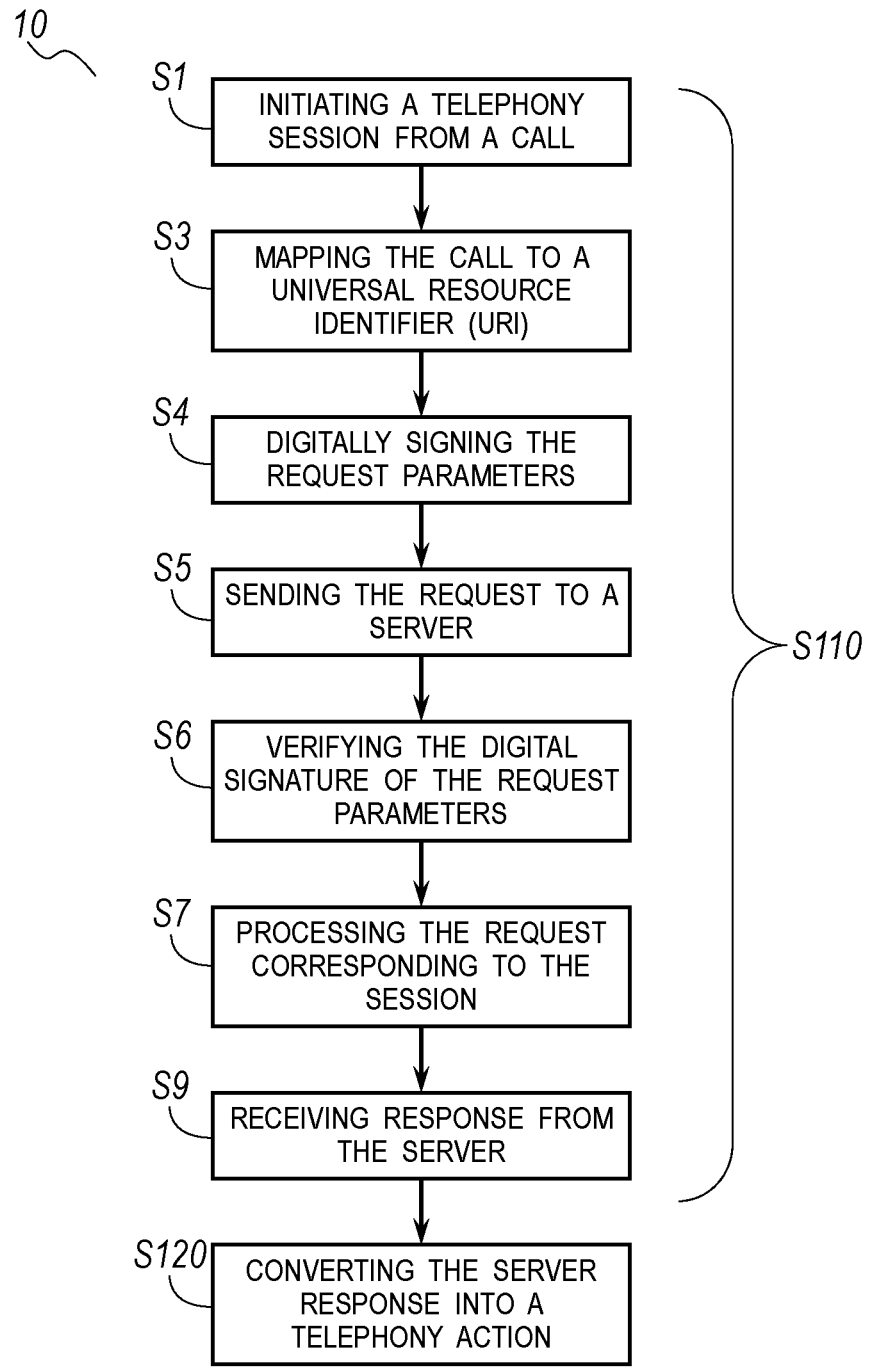
FIG. 1 is a flowchart representation of a preferred method of the invention.

As shown in FIG. 1, the step of communicating with an application server using an application layer protocol S110 preferably includes the following sub-steps: initiating a telephony session S1, mapping a call to a Universal Resource Identifier (URI) S3, sending a request to a server associated with the URI S5, processing the request corresponding to the state of a telephony session S7, and receiving a response from the server S9. One of the challenges of using the familiar web site visitor model is that a third party web application may expose URIs that contain sensitive data or that suggest actions that could maliciously manipulate the application database. In the preferred embodiment, the call router cryptographically signs outbound requests to customer web applications using an account-specific key. More specifically, the step of communicating with the application server includes the additional steps of digitally signing the request parameters S4 and verifying the digital signature of the request parameters S6. Only the call router and the application server know that key, so any request that includes parameters (URL, POST data, headers, etc) signed with that key can be checked for authenticity before allowing such operations. This method also provides verification of authenticity over insecure links (HTTP) with low CPU overhead.

Step S1, which recites initiating a telephony session, functions to accept an incoming message. The message is preferably a call from a PSTN-connected (Public Switched Telephone Network) or Internet addressable devices, such as landline phones, cellular phones, satellite phones, Voice-Over-Internet-Protocol (VOIP) phones, SIP devices, Skype, Gtalk, or any other suitable PSTN-connected or Internet addressable voice device. The message may alternatively be a Short Message Service (SMS) message. A SMS gateway server may alternatively connect to a SMS network through a Short Message Service Center ("SMS-C"), directly to the Signaling System #7 (SS7) telephony network, or by any other suitable SMS gateway provider, and the message is preferably received from the gateway by the call router and translated into a format (such as a URI) that can be sent over the public Internet such as HTTP, based on the recipient address of the SMS, such as a short code, or Direct Inward Dialing (DID), or other suitable unique recipient identifier. The message may alternatively be a multimedia message, a facsimile transmission, an email, or any other suitable messaging medium. The originating phone number of the PSTN device is preferably captured using caller ID, but any other suitable ID may be captured, such as a VOIP provider ID, SMS device number, email address, or a short code. The dialed phone number, the EIN, and/or billing identifier, and/or the date and time of the call are also preferably included in the session information. An authentication ID may additionally or alternatively be included in the session information.

In one variation, Step S also functions to initiate a telephony session (such as a phone call) via an HTTP or other request sent to a call router from an application running on a third-party server. In this variation, the application running on the server preferably specifies an initial URI for the call router to use for telephony session in step S3, as well as the phone number (or other addressable destination) to dial and the source phone number (caller id). In this variation, the call router API is preferably used by the application server to request an outgoing call from the call router.

Step S3, which recites mapping the call to a Universal Resource Identifier (URI), functions to enable a telephony session to be converted into a format that may be handled with standard web servers and web applications. The mapping is preferably performed using a call router. The initial URI is preferably pre-specified at the call router by a web application (which may be running on a third party server) or call router account owner. More preferably, the initial URI is assigned to the call via a unique identifier for the call destination, such as a DID (Direct Inbound Dial) phone number, or a VOIP SIP address. The URI may alternatively be specified by a remote server or other suitable device or method. In one variation, the URI may be used to encapsulate state information or a portion of state information from the initiated telephony session, such as the originating phone number, the dialed phone number, the date and time of the call, geographic location of the caller (e.g. country, city, state, and/or zip), and/or the unique call ID. The information included in the URI may be included in the form of a URI template. For example the URI default template could be: http://demo.twilio.com/myapp/{dialed phone number}/{originating phone number} or http://demo.twilio.com/myapp/foo.php?dialed_number={dialed phone number}&originating_number={originating phone number}.

Figure 16:
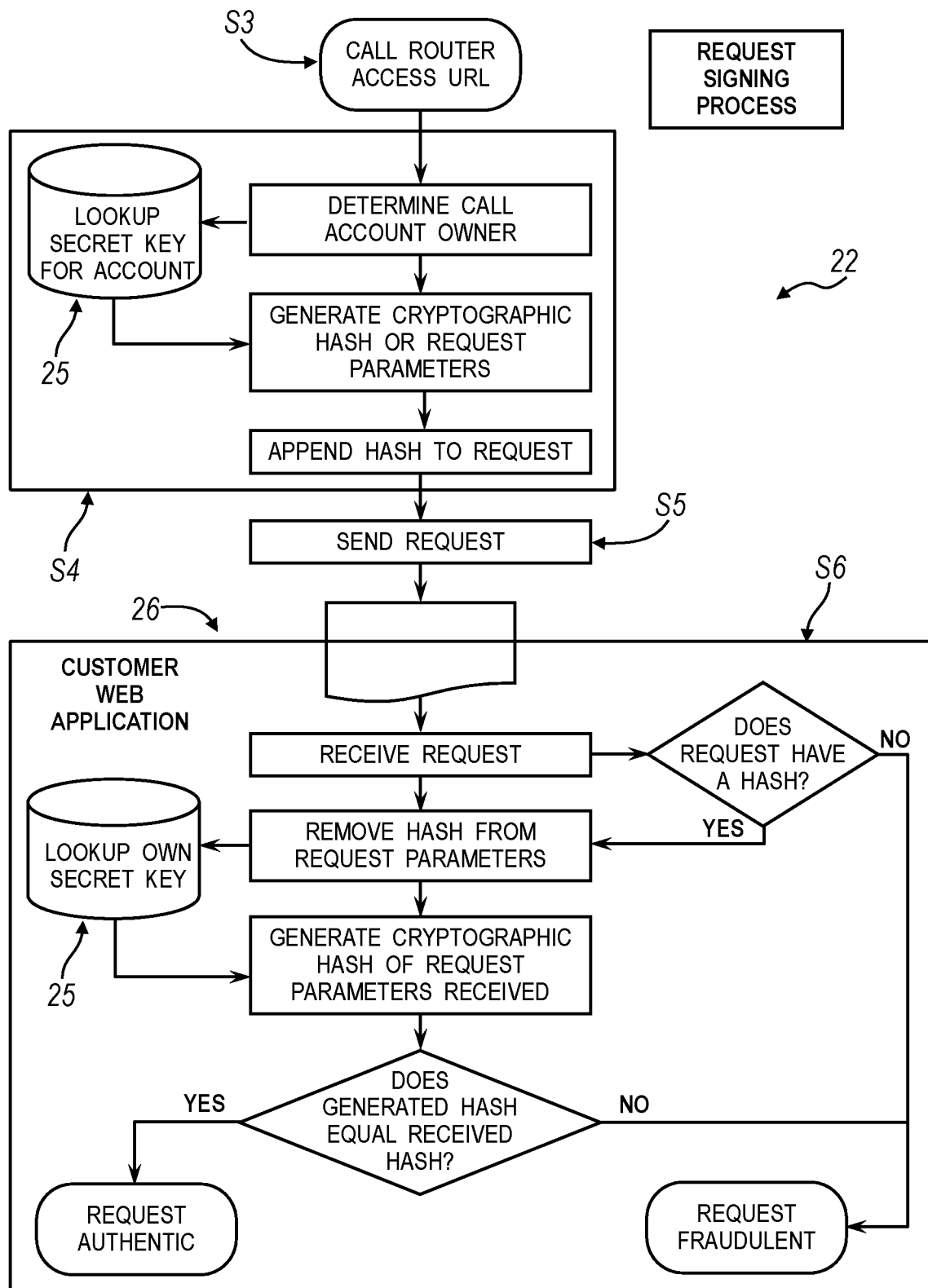
FIG. 16 is a flowchart representation of the sub-steps relating to the digital signature aspect of the preferred method of the invention.

Step S4 functions to digitally sign the request parameters. As shown in FIG. 16, Step S4 preferably determines the call router account owner and, more preferably, looks up the account owner's unique ID or secret key and signs a set of request parameters. Step S4 is preferably accomplished by generating a cryptographic hash of the request parameters, preferably including the URI as well as any request body parameters (in the case of an HTTP POST, for example) with the unique key associated with the call router account owner. The cryptographic hash is preferably generated by appending the hash of the request parameters to the original set of request parameters. The hash is preferably appended to a URL, but if the hash is particularly long (i.e. for a very large number of parameters) the hash may be included in an HTTP header, where there is no limitation on size. In a variation of Step S4, at least one sensitive parameter may be individually encrypted using the account owner's secret key before the hash is processed. In another variation, a cryptographic credential delegation system, such as Oauth (oauth.net), may alternatively be used to electronically sign the request.

Step S5 functions to send the request to a server. Preferably, the request is sent to a URI and, more preferably, the request is sent to the URI mapped in S3. The request preferably includes a cryptographic hash computed from the set of request parameters (acting as a digital signature), but the request may alternatively include individually encrypted request parameters if the parameters are determined to contain sensitive data. The server is preferably a third party server and, more preferably, the server is running a web application. The request is preferably sent to a server over a network. In one variation, the request is sent to a local server on a local area network. In another variation, the request is sent to a server running locally on the device originating the call. In yet another variation, the request may be sent to multiple servers. The request preferably encapsulates at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. If new state information is generated in the course of the operation of the call router, a request to the application server is preferably made to communicate the new state and to request new telephony instructions. Preferably, new state information is not kept or acted upon internally by the call router, but is passed to the application server for processing. Alternatively, partial state information is preferably stored on the call router until a fully updated state is achieved, and then communicated to the application server. For example, the application server may specify that multiple digits should be pressed on the keypad, not just one, before new call state is derived and communicated to the application server. In one variation, the information from the initiated telephone session may be a web-form submission included in the HTTP POST request. The request may include any state information from the telephony session, such as the originating phone number, the dialed phone number, the date and time of the call, and/or the unique call ID, the current status of the phone call (pending, in-progress, completed, etc.), or the results of a telephony action, including Dual Tone Multi Frequency (DTMF) digit processing, or a representation of or a link to a sound recording, or the status of the last command, or other call state. Examples of a HTTP GET request, a HTTP POST request, and a HTTP GET request are shown in FIGS. 4A, 4B, and 4C, respectively. Further examples of HTTP communication used for SMS messaging are shown in FIGS. 4D, 4E, and 4F. The HTTP request (or any suitable request communication) to the server preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The call router and/or the application server preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated. State information included with each request may include a unique call identifier, call status data such as whether the call is in-progress or completed, the caller ID of the caller, the phone number called, geographic data about the callers, and/or any suitable data. However, a varying level of a RESTful communication (statelessness) may be used, such as by using cookies, session tracking, or any suitable devices to simulate a normal website visitor model. Preferably, data sent with each request may fully enable the application server to determine the next state of the call to execute. RESTfulness preferably does not preclude using external datasource, such as a database, to lookup additional data to log call meta data, or determine application logic.

Figure 13:
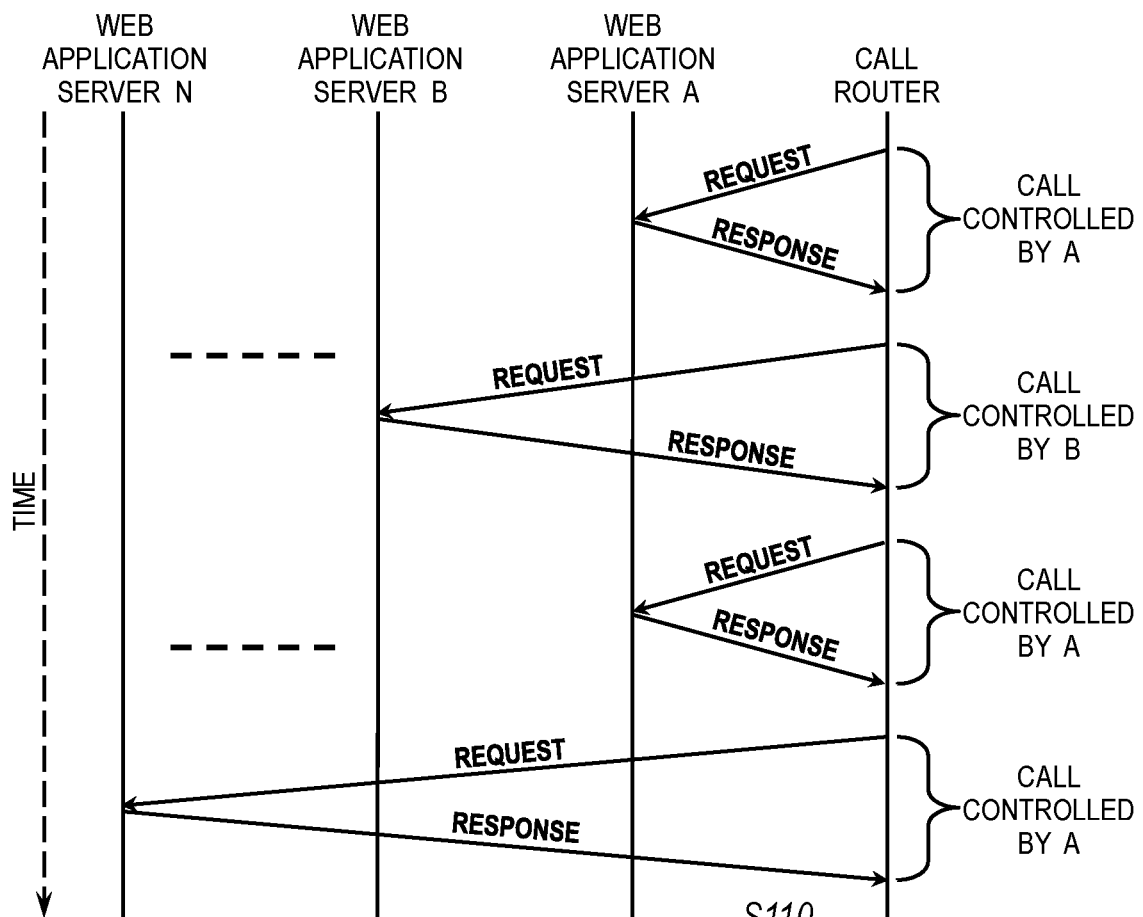

Step S6 functions to verify the digital signature of the request parameters. As shown in FIG. 13, after the request is received at the server, the request parameters are preferably checked and/or parsed for a hash. The cryptographic hash is preferably included in the URL of an HTTP request, but may alternatively be included in the HTTP header of the request. If the request does not include a hash, and the web application server has enabled the hash function checking as a security measure, the request is preferably determined to be fraudulent, which would include—for example—malicious requests, mis-routed requests, corrupted requests and any other requests not intended for the application server. If the set of request parameters includes a hash, the hash is preferably extracted from the request, and the secret key of the customer web application (i.e. the same key that is stored on the call router as the customer account secret key) is preferably used to generate a server side cryptographic hash of the parameters received. The server side cryptographic hash is preferably compared to the hash included with the request and if the hashes do not match, the request is preferably determined to be fraudulent. However, if the server side cryptographic hash matches the request hash, the request is preferably determined to be authentic and ready for further processing at the application server. In the variation mentioned above in Step S4, where sensitive parameters may have been encrypted using the secret key, Step S6 preferably includes decrypting the sensitive parameters. The application server and the third parties operating the application are preferably responsible for completing this verification step, but the verification may alternatively be completed by a single party, such as when a single party operates the application server and the call router. The application server may alternatively be configured to ignore a hash included with the request parameters if request authentication is not important to the application.

Step S7, which recites processing the request corresponding to the state of a telephony session, functions to perform processing functions on at least a portion of the data included in the request. The processing functions are preferably performed on a third party server. The processing functions may include recording the data included in the request and/or metadata about the call session, routing to another URI, performing a database lookup of at least one portion of the data included in the request, voice recognition processing, or any other suitable processing function. The processing functions may re-use logic and data from other business applications, such as customer databases and/or shopping cart applications, which may be linked using caller-id or caller provided information. State information is preferably communicated with each request from the call router, and application state is preferably not required on the application server. Alternatively, the application server may store state between each request related to the call, by using HTTP cookies, sessions, and/or database records. In some cases, such as the case of a static HTML page running on a server or a stored media file such as an mp3 or wav file stored on a server, Step S7 may be simplified, and a file mapped to disk by the URI may be simply returned.

Step S9 recites receiving a response from the server. This response is preferably an HTTP response. The response is preferably sent as XML, audio binary, or raw text, but may alternatively be any sort of messaging format, including HTML, delimited text, key/value text or binary encoded format. The HTTP response preferably includes directions to perform telephony actions. The response may alternatively or additionally include a new URI or a new URI template to use with the telephony action in Step S3. An additional example XML response is shown in FIGS. 5A and 5B.

1B. Processing Telephone Instructions

The step of processing telephone instructions with a call router S120 preferably functions to convert the server response into telephony actions or executable operations during a telephony session. The telephony actions may include, for example, playing a pre-recorded sound file at a server-specified URI (such as a static mp3 file located at http://demo.twilio.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, sending an SMS message, or any suitable combination or sequence of these or other suitable actions. This conversion of the server response is preferably performed at a call router. Preferably, Step S120 includes processing the response mime-types associated with the server response. For example, if the response mime-type is XML, it is considered to be a set of call router instructions. If the response mime-type is MP3, it is considered a sound file to be played for the caller. If the response type is plain text, it is considered to be text to be read, via Text-To-Speech, to the caller.

Figure 14:
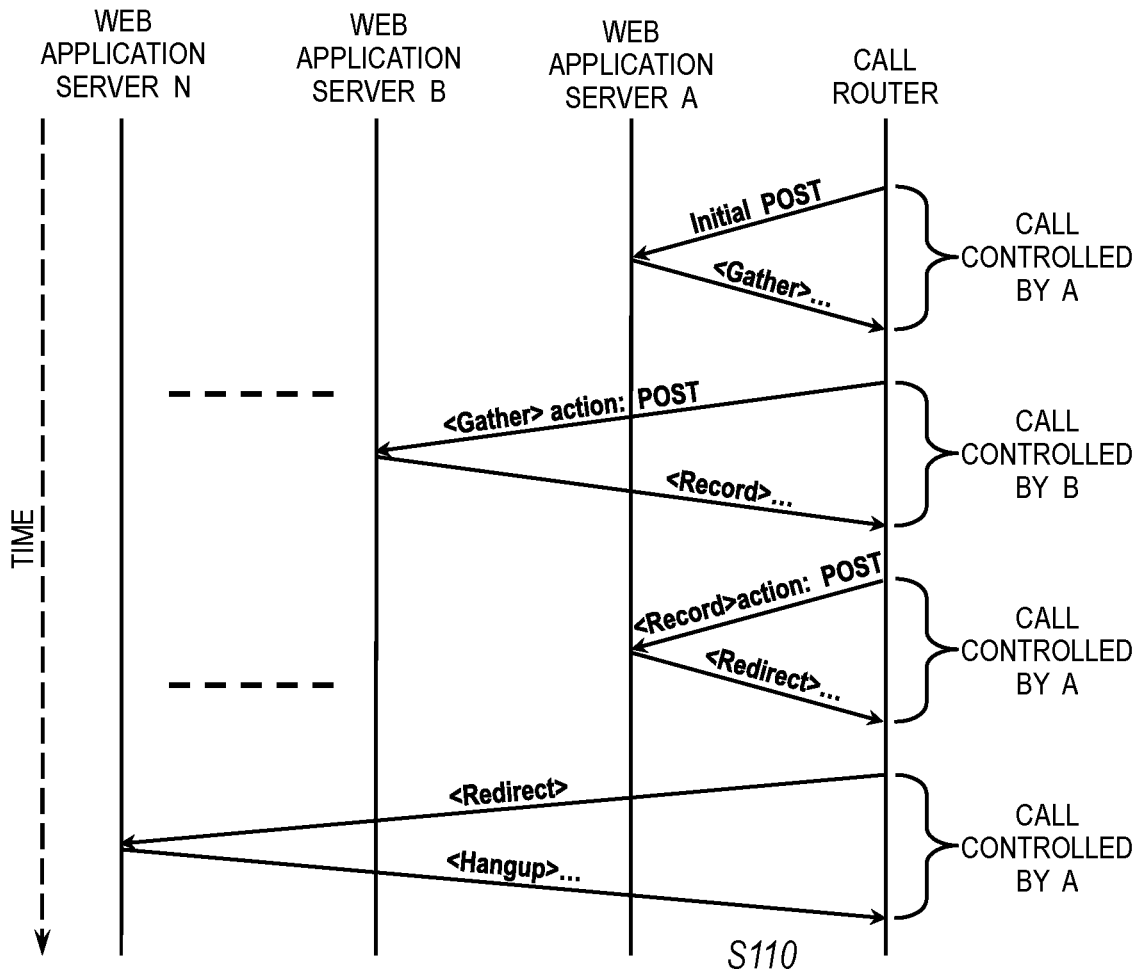

Contents of the server response, such as an XML document, are preferably converted into a telephony action by processing the document sequentially (e.g. line by line). Telephony instructions are preferably contained within the document in the form of a markup language, such as XML as shown in FIGS. 5A and 5B. This sequential approach to processing a document of telephony instructions is enabled when the communication is stateless and all the necessary information is contained within the URI. This stateless communication preferably allows telephony instructions (verbs or commands) to be used as the programming interface for a server application performing telephony services. Algorithmic interpretation (based on the state of the communication) of the telephony verbs or the document is preferably not necessary. The telephony actions are preferably executed in the order of telephony instructions found in the contents of the server response. For example, an XML document may include the necessary verbs to carry out the telephony actions of reading text to a caller, monitoring keys pressed by the caller, and redirecting the caller to a new URI using the pressed keys as part of the data within the new URI. Preferably, the telephony action (such as digits pressed) results in new state information, which may result in a repetition of some steps of the method, preferably beginning at Steps S3. The next URI is preferably provided by the server as part of the processing instructions. In another variation, the last URI is reused if the server fails to specify a next URI. In yet another variation, no repetition occurs if the server fails to specify a next URI, and processing continues below at the next call router instruction. The behavior may be determined by the nature of the call router instruction; for example, instructions that generate no new state information would not need to have a next URI since they don't trigger communication with a remote server. More preferably, the telephony actions result in the repetition of step S3 with the new URI resulting from Step S11, but may alternatively initiate a repetition of one or more steps (Steps S5, S7, S9, or S11) of the method. Step S3 is preferably repeated using all new phone session state information resulting from execution of a telephony action, such as digits pressed, a recorded audio file, or the success or failure of any telephony action requested. Repetition also includes all state information that remains relevant during the course of the session, such as Caller, Called, unique Call ID, and call status. The state information may also be represented in the form of a URI Template. For example, if the server response specifies that the call router should collect DTMF digits, and specifies that the next URL is the URI Template http://demo.twilio.com/foo.php?digits={Digits}, and the caller presses 1234, the resulting URI is http://demo.twilio.com/foo.php?digits=1234. Similarly, if the server response specifies the URI Template: http://demo.twilio.com/myapp/{Digits}.mp3, the resulting HTTP Request could be to a static mp3 file located at: http://demo.twilio.com/myapp/1234.mp3. Thus, a call may be controlled by one server that issued the telephony instruction and a second server that processes the response, as shown in FIGS. 13 and 14. Such call control hand-offs constitute the transfer of state information between servers in the form of a URI and accompanying request data, such as GET, POST, and/or request body. Preferably, all state communications conform to a syntax established by the call router to facilitate integration between multiple servers. For example, digits pressed on the keypad are preferably communicated to application servers in an identical fashion, thus minimizing the need for coordination between a multiple application servers with regard to how state is transferred. Alternatively, call router instructions may dictate the method of communicating new state information, such as the names and types of variables to send representing new state.

1C. Creating Resources Accessible by a Call Router API

The step of creating call router resources accessible through an Application Programming Interface (API) S130 preferably functions to expose information and/or functionality of the call router. The interaction from outside parties is preferably performed via the API (call router API). The Call Router API may additionally cooperate with the use of telephony instructions to function as a storage and retrieval format for data generated or required by the call router's operation. The Call Router API is preferably an application programming interface (API) such as a REST API (Representational State Transfer) as is known in the art, but the Call Router API may alternatively be a SOAP (Simple Object Access Protocol) API or any suitable programmatic communication interface. The Call Router API preferably may be used by an application asynchronously to the execution of a call (such as to later query the call records or retrieve recordings). Alternatively, the Call Router API may be used synchronously during the course of a call (such as to alter the state of the call, hanging up a call, initiating call recording, etc.). The Call Router API preferably stores state information in a persistent URI for a resource. The persistent URI preferably contains all the necessary state information, and this preferably makes data persistent, queryable, and recoverable. The Call Router API is preferably used for modifying resources to alter state of call router and for interacting with media of the call router. An application server can use the Call Router API to preferably query meta-data of call records, caller identification, call media (such as recordings, text transcripts, etc.), account information, transfer or interact with in-progress communications in the call router, and/or any suitable data generated by or required to operate the call router. The Call Router API preferably involves communication between an application server and a call router, but may alternatively be communication from any suitable device to the call router. The Call Router API preferably resides on the same hardware as the call router, but may alternatively reside on remote hardware or on any suitable hardware environment. The communication is preferably HTTP, but alternatively HTTPS or any suitable communication protocol may be used. The Call Router API may additionally be compatible with any HTTP client. The telephony system of the preferred embodiment preferably implements a Call Router API that includes a Call Router API request format, a Call Router API response format, and a plurality of API Resources representing types of data generated by or used by the Call Router.

The Call Router API request of the preferred embodiment functions as a communication message sent from an application server to an API resource of the call router. The Call Router API request is preferably sent from an application server to a call router, but may be sent from any suitable device to the call router. The Call Router API request is preferably similar to a REST API request, but the Call Router API request may alternatively conform to any suitable programming principle, such as SOAP. The Call Router API request preferably uses HTTP to interface with a resource, but HTTPS or any suitable communication protocol may be used. Preferably the HTTP or HTTPS method of GET is used to retrieve a resource or resource information, and the HTTP or HTTPS method of PUT or POST is used to create or update a resource. In some cases, PUT or POST may be used to affect the functionality of the call router by modifying the state of a resource. Alternatively, a method parameter may be included in the URI of the resource to identify a requested action for the resource, or any suitable commands or methods may be used to interface with an API resource. The Call Router API request preferably includes authentication such as basic HTTP or HTTPS authentication, by including message authentication information in the URI, such as a cryptographic hashing of the request content using a shared key, or by any suitable method.

The Call Router API response of the preferred embodiment functions as a communication sent in response to a method performed on an API resource. The Call Router API response is preferably sent from the call router to an application server, or any suitable device. The Call Router API response is preferably sent in response to a Call Router API request, and the response is preferably sent to the originating device. The Call Router API response is preferably similar to a REST API response, where the response is a representation of the requested resource. The Call Router API response may alternatively conform to any suitable programming principle such as SOAP. The Call Router API response is preferably returned as formatted XML with information corresponding to the HTTP status code, a message, error codes, and/or any suitable information related to the resource. The Call router API response may alternatively be represented as Comma-separated values list (CSVs), HTML, JSON, or any suitable format. In one variation, the response format is determined by a portion of the requested URI, such as a file extension. In one variation, an API resource may be a binary data resource, and the Call Router API response is preferably formatted in a native binary format (e.g., a way or mp3 audio file), an XML meta-data description, and or any suitable format.

The API resource of the preferred embodiment functions as an addressable representation of call router meta-data, internal call router state, or the state of a given resource used by the call router. An API resource is preferably addressed by a persistent URI. Preferably, the API resource responds to at least one HTTP action of POST, PUT, GET, or DELETE. The API resource may alternatively respond to multiple HTTP actions. The API resource may alternatively respond to any suitable method(s) that are preferably included in the Call Router API request. Consistent with the RESTful conventions, a GET request of a resource may return the current state of a resource, while PUT may update the state, PUT or POST may be used to create a new resource, and DELETE may be used to destroy a resource. The call router API may alternatively be used to affect the functionality of an in-progress call in addition to modifying data. The API resources of the preferred embodiment include an account resource, caller ID resource, incoming address resource, call resource, media resource, and/or any suitable resource of the call router. The API resources may alternatively be any suitable combination of the listed resources or other suitable resources. An API resource is preferably a preconfigured (or "static") resource, such as account information, or a resource actively in use by the call router, such as a phone call. Modifying the state of a resource via the API may additionally affect the operation of the call router in real-time, affect the state or capabilities of the call router in the future, and/or have any suitable effect.

The account resource of the preferred embodiment functions to allow an application to retrieve and/or modify account information. An account is preferably created by a telephony service provider, such as the operator of the call router. Information such as account name, usage information, contact information, initial URI, setup parameters, or any suitable account information may be retrieved or edited by an application using the account resource.

The caller ID resource of the preferred embodiment functions to allow an application to retrieve, modify, register new caller ID's (phone numbers), and/or delete caller identification information. The caller identification information is preferably for the phone number associated with outgoing calls made by an application and/or user (i.e. where the application appears to be calling from). The numbers for outgoing calls are preferably assigned or verified prior to being used as a caller ID. As an alternative, to prevent fraudulent use of caller ID phone numbers in applications, a verification step may be used by the API before adding a new caller ID resource. A request to add a caller ID may be initiated via a request to the API, wherein a random validation code is generated and returned in the API response. The validation code is preferably provided to an end user. A phone call is placed to the given phone number (caller ID), requesting that the validation code be entered via keypad digits or spoken. Entry of the validation code verifies possession of the phone number, or the device associated with the phone number, at the time of the request. Use of the caller ID resource may additionally be presented in a user interface, such as a web browser, by displaying the verification code. User interface may be provided by the operator of the call router, or may be provided by any suitable application using the API. Any suitable method may also be used for verification of a caller ID. In another alternative, where multiple parties are involved in a call, the caller ID of one of the existing party members may be assigned for additional outgoing calls during that call session.

The incoming address resource of the preferred embodiment functions to allow an application to get, modify, or provision new inbound DID phone numbers, SMS short codes, SIP Addresses, etc. for use with applications. PUT or POST may be used to set the initial URI associated with the inbound address. DELETE may be used to release the resource. The incoming address resource may be used for real-time provisioning of phone numbers or other addressable inbound identifiers.

The call resource of the preferred embodiment functions to allow an application to get or modify the state of a telephony session in the call router. A telephony session or call may be in-progress, completed, failed, not yet initiated, and/or in any suitable call status. A call resource can preferably change the state or connection of an in-progress call. State changes preferably include: hanging up or terminating existing telephony sessions, transferring one or more existing telephony sessions from one contextual group of sessions to another, merging or splitting an existing group telephony sessions, transferring one or more telephony sessions from one communications medium to another (such as from one URI to a second URI), injecting an event or notification into a existing session or group of sessions, recording or ceasing to record the audio from one or more parties on a call, and/or any suitable call action. Call information or call log data can preferably be retrieved by sending a GET to the call resource or by alternatively sending any suitable method. Outgoing calls may also be initiated by using a POST or any suitable method that preferably indicates that a new call resource is to be created. When using the call resource to initiate a call, information may be provided as required to place a phone call, such as a caller ID to present, a phone number to call, and/or a URI to handle the call, but alternatively any suitable information may be provided. A call instruction XML document may alternatively be provided to the API instead of a URI, which is to be used for call instructions. The Call Router API may additionally respond with the status of a call such as if the call is answered, if a machine answered the phone, busy signal, no answer, call failure, and/or any suitable call status. The response may alternatively indicate that the new call request was accepted, but has not yet been initiated. In the example shown in FIG. 6, caller information and caller ID are included in a POST request to the call resource. This step would initiate an outgoing call to the phone number designated in the caller information. The Call Router API response includes available state information regarding the call, such as whether the call has commenced yet, the call start time, end time, price, caller info, and the Call Router API response could alternatively include any suitable information. Additionally, information about the call returned at any point by the API may depend on the status of the call. For example, a call start time would not be given if the call has not yet begun, or the call end time, duration or price would not be given if the call had not yet ended.

Figure 15:
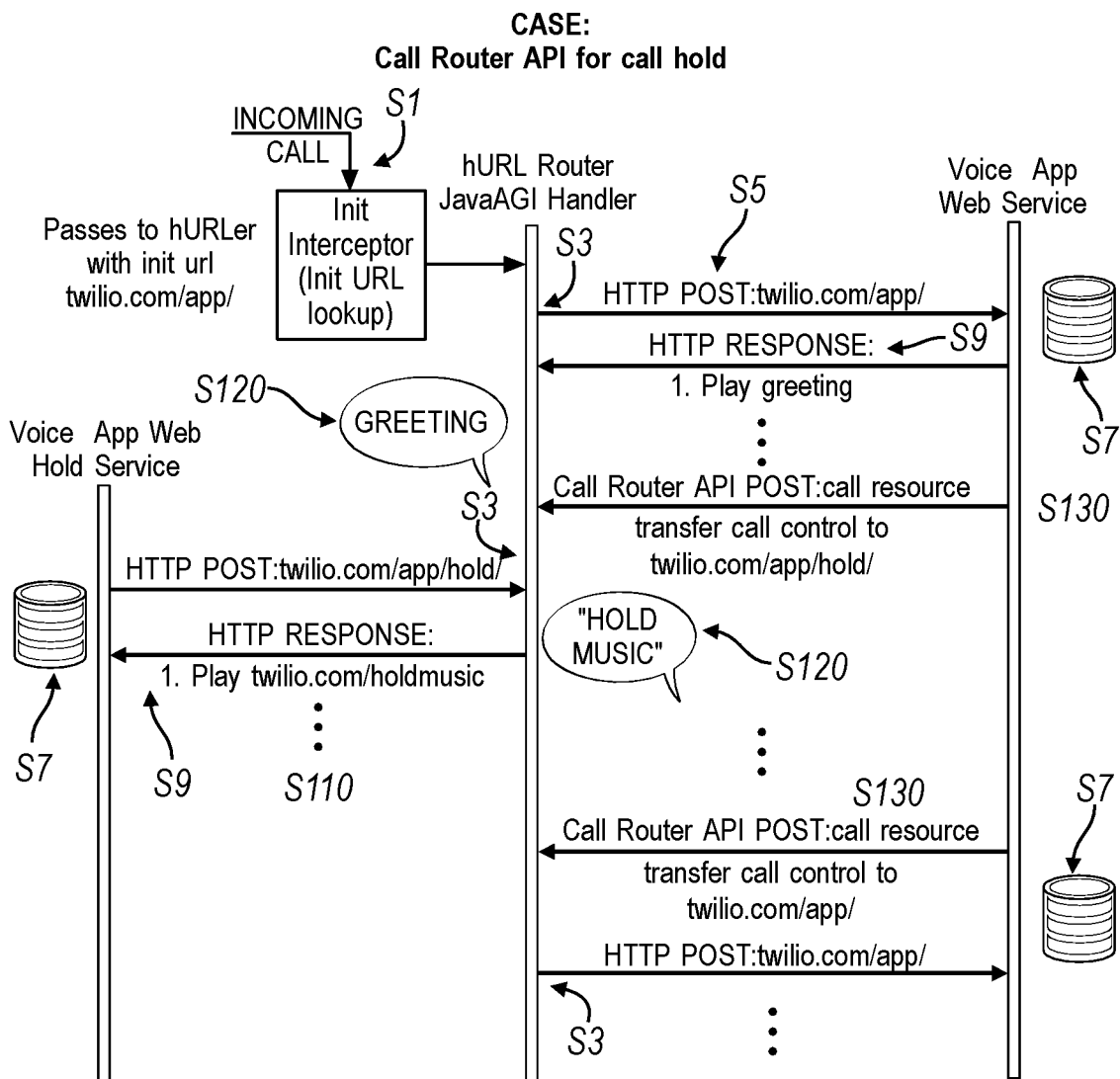

Additionally or alternatively, the call resource of the preferred embodiment may be used to transfer a call to a new URI by a single call resource receiving a POST, PUT, and/or any suitable method. In this alternative, a call is preferably transferred to the new URI for new call instructions. The API may preferably be used to issue asynchronous changes in call state, unlike the synchronous communication between the call router and application server for synchronous URI requests and responses. The call resource, in this alternative, functions to allow a call to be asynchronously directed to URIs. Examples of various applications of the call resource include initiating a new telephony session, terminating an existing telephony session, call waiting, call holding, call queuing, call parking, private call sessions within a conference, carry on multiple call sessions, and/or any suitable application. Any situation where asynchronous events affect the call status, such as a call agent becoming available, or a person returning to the phone after placing a caller on hold. The currently executing call router instruction may be allowed to complete, or may be immediately terminated, before requesting the provided URI. New call state resulting from the last call instruction executed by the call router, such as digits pressed on the keypad or audio recorded from the caller, may be provided to the new URI in a form POST or GET parameters, or may alternatively be discarded by the call router and not provided. As shown in FIG. 15, call waiting may be implemented by an application sending a Call Router API request to the call resource that POSTs a new URI for the call. The caller is then directed to the new URI for instructions. A second Call Router API request is sent to the call resource that POSTs the original URI for the call, and thus brings the caller back to the first call session. The call resource may alternatively be used in any suitable application.

As an alternative embodiment of the call resource, a calls resource may implement a plurality of individual calls as distinct subresources. For example, a URI ending in "/Calls" may be a list of many calls performed by the account, and a URI ending in "/Calls/12345" may represent one specific call, uniquely identified by the key "12345". The calls resource preferably allows retrieval of many call records and/or creating new calls, while a single-call resource represents a single call. The calls resource preferably accepts a request to create a new call resource, as is common in RESTful architectures, which in the Call Router API, preferably serves to initiate one or more new calls. A calls resource may be used to both list current and previous calls using the GET method, as well as initiate a new outbound call using the POST method. Using RESTful principles such as POST or PUT to alter the state of an individual call resource can preferably change the state of an in-progress call, affecting the realtime activities of the call, such as by hanging up, transferring control to a new URI, joining the call with another call, or any suitable telephony action.

The media resource of the preferred embodiment functions to allow an application to retrieve and/or access information of media stored, cached, created, and/or used during a call. In one variation, the media resource is preferably a recording resource to access information and recordings made during a call via recording call instructions, or asynchronously via the Call Router API. In another variation, the media resource may alternatively include call transcripts, text messages, key press logs, faxes, a binary-coded resource, and/or any suitable media. The media resource may alternatively include a URI of the binary-coded file (such as a way, mp3 audio file or PDF document file). In one variation, the media resources may additionally be integrated with the telephony instructions (or markup language) such that a telephony instruction may instruct the call router to perform an action that creates a media resource. The call router preferably sends a response to the application server with the URI of the created media resource. For example, when the call router is instructed to record a message, the call router preferably sends a response to the application server with a unique URI of the recorded message within the API. The media URI preferably responds to GET requests to return the media in a number of formats, such as binary or XML meta-data representations. The media resource may accept requests to delete a media resource. In one variation, the media resource preferably requires authentication to access the resource. In another variation, the media resource may not require authentication to enable URI embedding in a variety of applications, without exposing authentication credentials. In yet another variation, authentication is preferably performed via cryptographic hashing, such that credentials are not exposed to client applications that consume the media resources. In another variation, the media resource allows the initiation of transcription of audio resources to text using transcription technology. The audio resource used for transcription is preferably generated during telephony sessions (such as by using the record instruction) and hosted on the Call Router API. The media resource preferably allows retrieving or deletion of audio transcriptions generated from recorded media. The media resource may additionally allow centralized hosting of media files, and the resource URIs are preferably exchanged between the call router and the application server, instead of the large media files themselves. The media resource may alternatively be used for any suitable media.

Additionally or alternatively, a join resource of the preferred embodiment may be used to join one or calls into a shared session that allows the parties to communicate (i.e., a conference) by a single call resource receiving a POST, PUT, and/or any suitable method. In this alternative, one or more calls are preferably join together such that they are in a conference. The join resource may alternatively be a subresource or part of the call resource.

Additionally or alternatively, a split resource of the preferred embodiment may be used to split shared sessions (e.g., a conference) into individual call sessions by a single call resource receiving a POST, PUT, and/or any suitable method. In this alternative, one or more shared sessions involving two or more calls are preferably split such that one or more calls are split into separate calls or into on or more separate conferences. The split resource may alternatively be a subresource or part of the call resource.

2. System for Handling Telephony Sessions

Figure 2A:
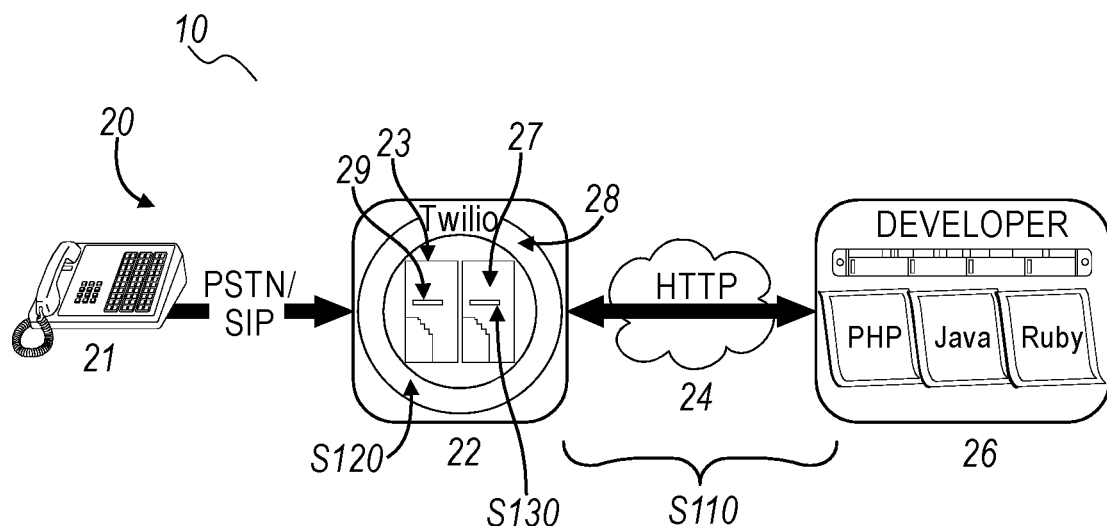
FIGS. 2A, 2B, 3A and 3B are schematic representations of preferred embodiments of the invention.
Figure 2B:
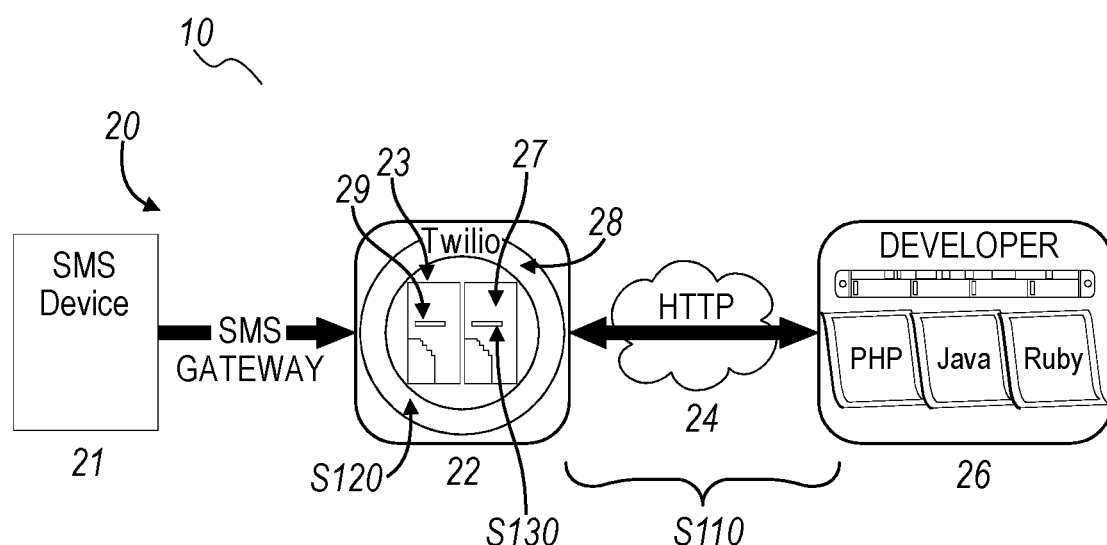
Figure 3A:
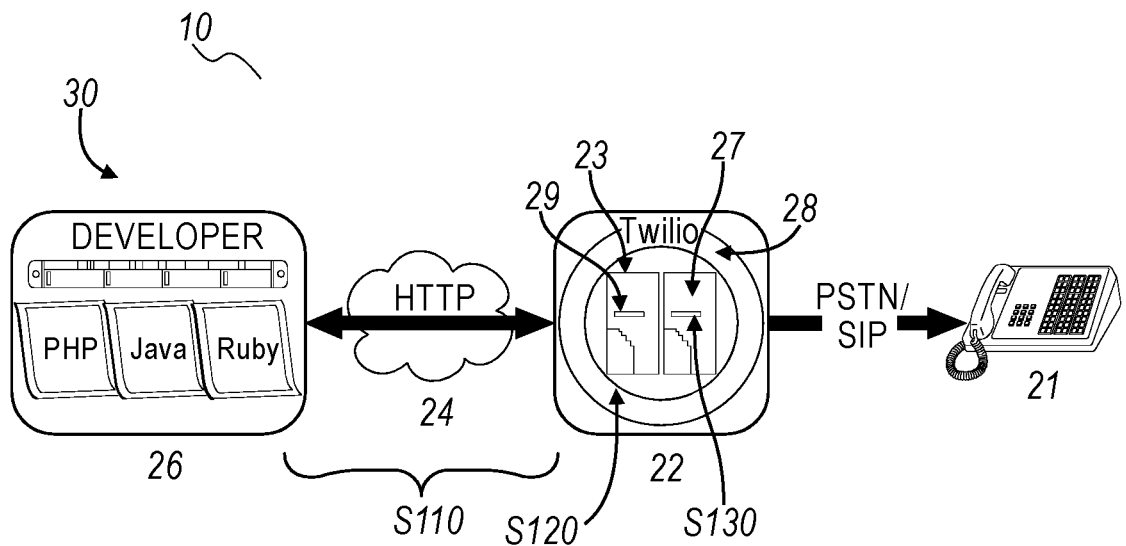
Figure 3B:
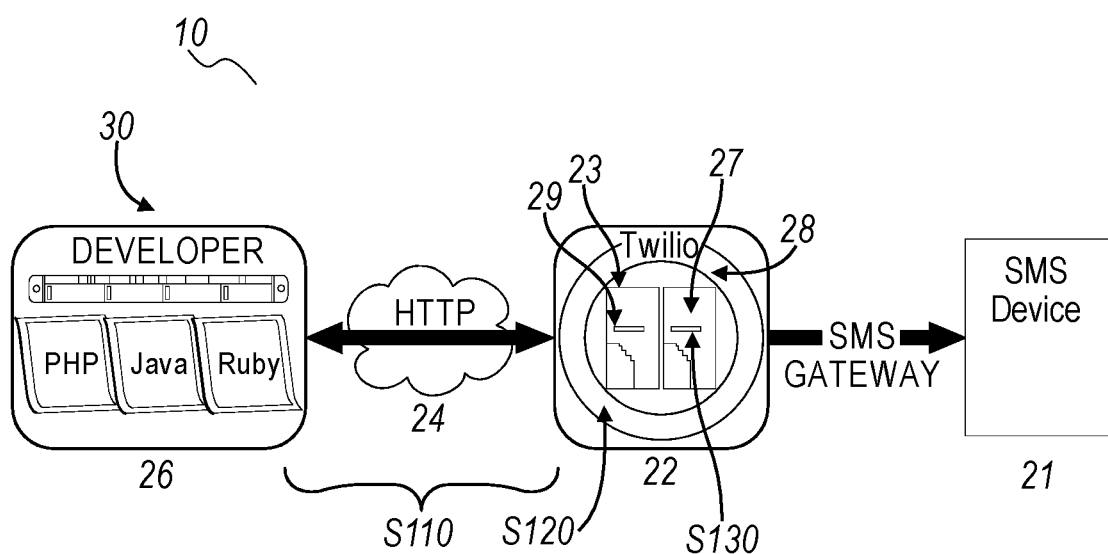

As shown in FIGS. 2A, 2B, 3A, and 3B, a system 20 and 30 of the preferred embodiment for handling telephony sessions includes a call router 22, a URI 23 for an application server, a telephony instruction 27, and a call router resource 29. As shown in FIGS. 2A and 2B, a first configuration 20 is initiated by a telephony device (such as a telephone call, fax or SMS message). As shown in FIGS. 3A and 3B, a second configuration 30 is initiated by an application developer side (i.e., server 26 calling out). The telephony system of the preferred embodiment preferably additionally implements a Call Router API 28 that includes a Call Router API request format, a Call Router API response format and a plurality of resources substantially similar to those described above.

The call router 22 functions to initiate or receive calls from the telephony device and connect to a web-application server. The call router 22 is preferably connected to a PSTN device over the PSTN network, such that it can receive and make calls from PSTN-connected devices 21, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices. The call router 22 may alternatively or additionally function as or include a message router for use with SMS messages. The call router 22 can preferably connect to an SMS network, such that it can receive and send messages from SMS network devices 21, cellular phones, computers, smartphones, or any suitable SMS network devices. The call router 22 may also send or receive text messages, multimedia messages, emails, faxes and other suitable PSTN-compatible communication messages. The call router 22 preferably communicates with the application server 26 using an application layer protocol, more preferably using the HTTP, or secure HTTPS, protocol. The communication between the application server 26 and the call router 22 is preferably stateless and any state information (e.g., call state) or data is preferably located in a URI or the request parameters, such as HTTP headers, GET URI parameters, POST request body parameters, or HTTP cookies. Available state information is preferably transmitted by call router requests to the application server for stateless processing, and the application server preferably stores no state. Alternatively, the application server preferably stores local state information, such as databases or sessions, as is common in web development. The call router 22 preferably stores state information in call router resources 29. The call router resources 29 are preferably accessible by the application server 26 and other devices through the call router API 28. The call router resources 29 are preferably similar to those described above. The call router 22 preferably associates each incoming phone number with a starting URI 23, more preferably the URI 23 is provided by the application server 26, still more preferably the URI 23 is provided by the application developer before a call is received at the call router 22 by associating the initial URI with the incoming call address (such as DID, SIP address, etc.) or by the application upon initiation of an outgoing call. The call router 22 preferably sends call data such as the caller number (obtained via Caller ID), caller geographic data (country, city, and/or state, zip) the number dialed, the time of the call, or any other suitable information or parameter. The call data is preferably digitally signed with a secret key 25 stored on the call router 22. A cryptographic hash of the information is preferably included along with the information as a digital signature. The call router 22 may also encrypt sensitive information (either before or after the cryptographic hash is computed) using the secret key to allow sensitive information to be sent across the network. The call data is preferably sent as an HTTP POST request to the application server 26. Call data may also be sent in URL (GET) variables, or encapsulated in HTTP headers. An example HTTP request containing the information in the header is shown in FIGS. 4A and 4D. As shown in FIG. 4B, further inputs (such as voice recording or DTMF button pressing) from the PSTN-device may be subsequently submitted to the application server 26 as HTTP requests (GET or POST). As shown in FIG. 4C, the inputs from a phone keypad may be included in an HTTP GET request. As shown in FIG. 4E, the content of an SMS message received by the call router may be sent to the application server 26 as an HTTP request. As shown in FIG. 4F, the inputs from the text message are included in an HTTP GET request. The request data may alternatively be simultaneously sent in the URI (query string), message body (POST) and message headers, or any combination of the above.

The application server 26 functions to provide data processing logic for requests received from the call router 22. The application server 26 is preferably connected to the call router 22 via a network 24, more preferably via the Internet. The application server 26 is preferably a third party server operated outside of the system, but the system may alternatively include the application server 26. The URI 23 is preferably associated with an application server 26 or an application on an application server 26. The application server 26 preferably communicates with the call router 22 using an application layer protocol, more preferably using the HTTP protocol, or more secure HTTPS protocol. The application server 26 preferably receives HTTP requests from and sends HTTP responses to the call router 22. The application server 26 preferably runs on a standard stack of programming languages, hosting providers, operating systems and databases to handle HTTP requests, as if the caller were a website visitor in a web browser. The application server 26 also preferably verifies the digital signatures of the call data received in the requests using the secret key to compute a cryptographic hash from the received information and the hash received. If the computed hash and the received hash do not match, or no hash is received with the request, then the application server 26 preferably determines the request is fraudulent, and the request is preferably discarded. If the computed hash and received hash match, the application server 26 preferably determines that the request is authentic and proceeds further with the processing of the request. The application server may alternatively choose to ignore the hash if security is not important. The application server preferably uses call state data communicated by the call router request to determine the next call router instructions, without requiring call state stored on the application server. The application server may alternatively use call state data sent by the call router, such as the caller ID of the caller or the unique ID of the call, to reference additional or external state data, such as rows in a database or session data stored on the application server. The application server 26 preferably responds to HTTP requests received from the call router 22 by generating telephony instructions 27 for the call router 22. The application server preferably replies to the call router in XML, however, any suitable machine-readable message format may be used, including HTML, key/value pair text, delimited text or binary encoding. The XML preferably includes the telephony instructions 27 for the call router 22 such as connecting to another number, playing a recorded greeting, reading text, and/or requesting DTMF digit entry from the caller. The telephony instruction 27 may alternatively be related to SMS messaging, Multimedia Messaging Service (MMS) messaging, email, or any suitable messaging task. The telephony instruction 27 may additionally be used to send an outgoing SMS message, arrange a phone call from a specific phone number, arranging for a callback, setting up a conference call (connecting multiple numbers), sending an email, interfacing with a calendar or scheduling system, purchasing goods, or services, or any other suitable instruction. The XML instructions are preferably a set of commands to be executed in order, one at a time (i.e., sequentially). An example XML response is shown in FIGS. 5A and 5B. In single telephony session (e.g. one initiated by a PSTN-device or an SMS device) a response from an application server can initiate an outgoing telephony call and/or a SMS message. That is, a single XML response preferably provides the ability to interact with both the SMS network and the voice telephony network (PSTN, SIP/VoIP, etc) sequentially or simultaneously. In addition, audio or video files sent to the call router 22 can be converted to text by an automatic speech-to-text engine, human or other technique, and sent back in text form as an SMS message or an attachment to an MMS. In one variation, an application running on a server may be a simple static XML page and static sound files, deployed on basic web servers where no development or scripting environment is available. This variation preferably uses URI Templates (a current IETF proposal for HTML5), which essentially includes URLs with placeholders for variable data, like this: http://www.twilio.com/audio/{Digit}.mp3 where the call router 22 would substitute the digits pressed for the {Digit} placeholder in the URI Template, GET the file at the resulting URI, and play the static sound file in response. This allows an entire application to be authored offline in a What-You-See-Is-What-You-Get (WYSIWYG) html editor. For example, if the server response specifies the URI Template: http://demo.twilio.com/myapp/{Digits}.mp3, and the caller presses digits 1234, the call router 22 would GET the static mp3 file located at: http://demo.twilio.com/myapp/1234.mp3 and play it to the caller. The variables used for substitution in the URI Templates preferably correspond to the names of variables defined for state submission in HTTP GET, POST and/or header requests from the call router. From the previous example, {Digits} would be associated with a parameter named "Digits" that is preferably generated as a result of a "gather" telephony instruction (collection of DTMF digits). In the preferred embodiment for the second configuration, the call is initiated by the application server 26 (through the call router 22), and the second configuration 30 is substantially similar to the first configuration 20, such that the call routing is preferably handled identically to an incoming call, namely via URI requests from call router 22 to the server 26 upon call state changes. The application server preferably additionally is able to make calls to the Call Router API as described above.

3. Example Applications

Figure 10:
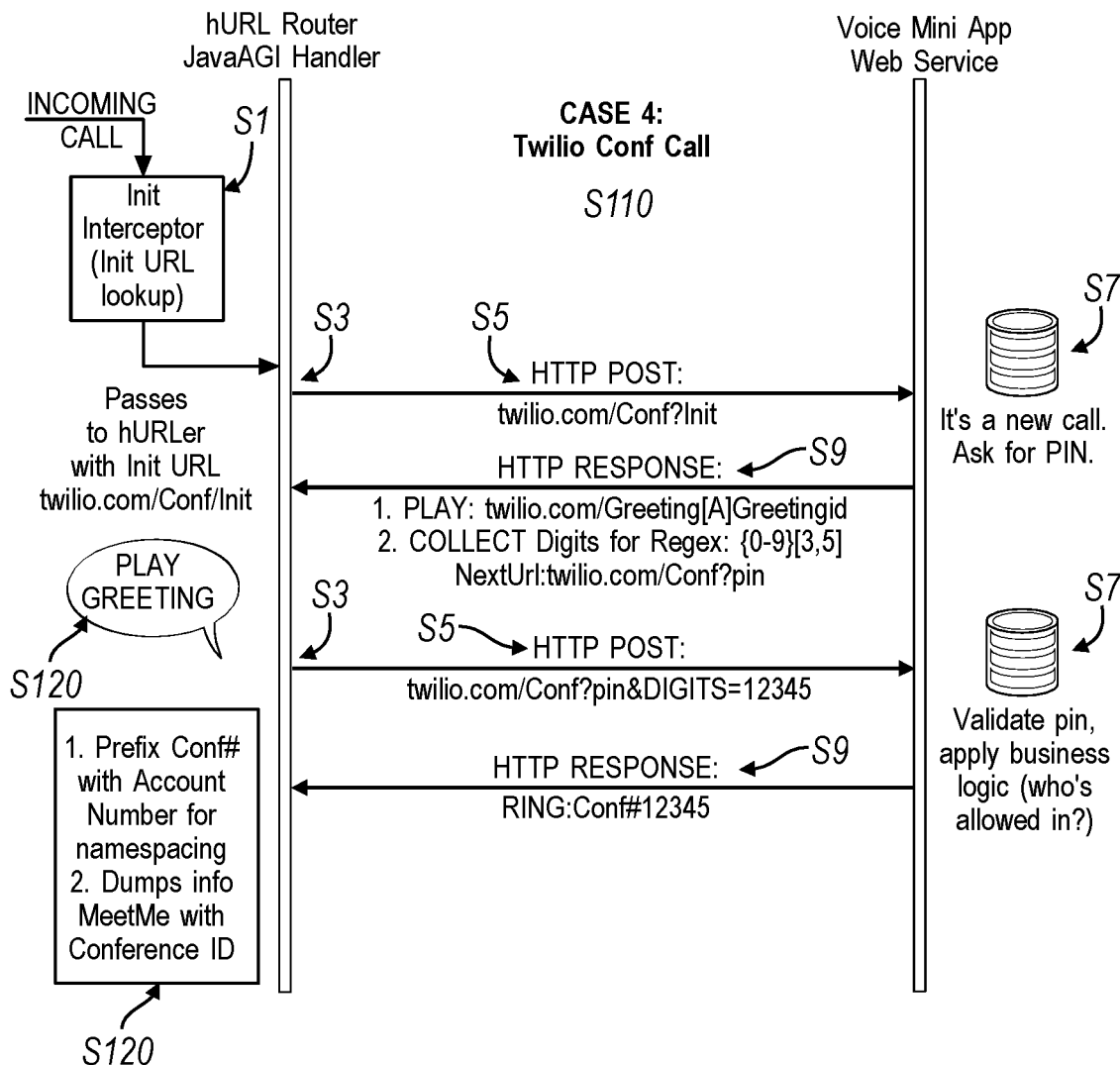
Figure 11:
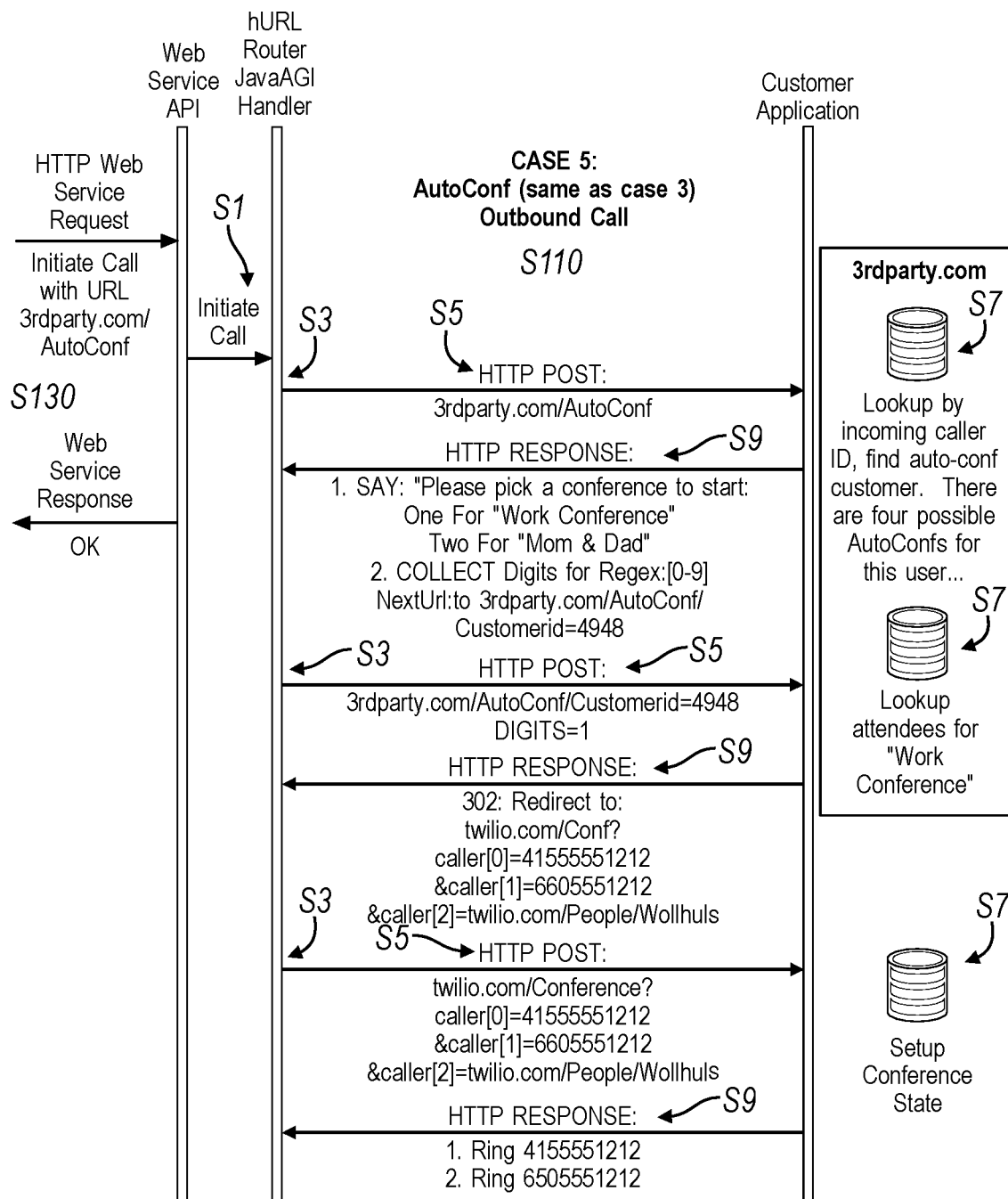

Call router applications are preferably web applications, implementing the most common phone system features with full APIs for administration. Each Call Router Application object has a unique URI. A call may be transferred to that object instance by specifying its URI as a call destination. The call router applications preferably include: the AutoAttendant application (in FIG. 7), the Follow Me application (in FIG. 8), the Conference application (in FIG. 9), the AutoConference application (in FIGS. 9-11), the Device application, the Person application, the VoicemailBox application, the Group application, and the Queuing application (in FIG. 12).

Figure 7:
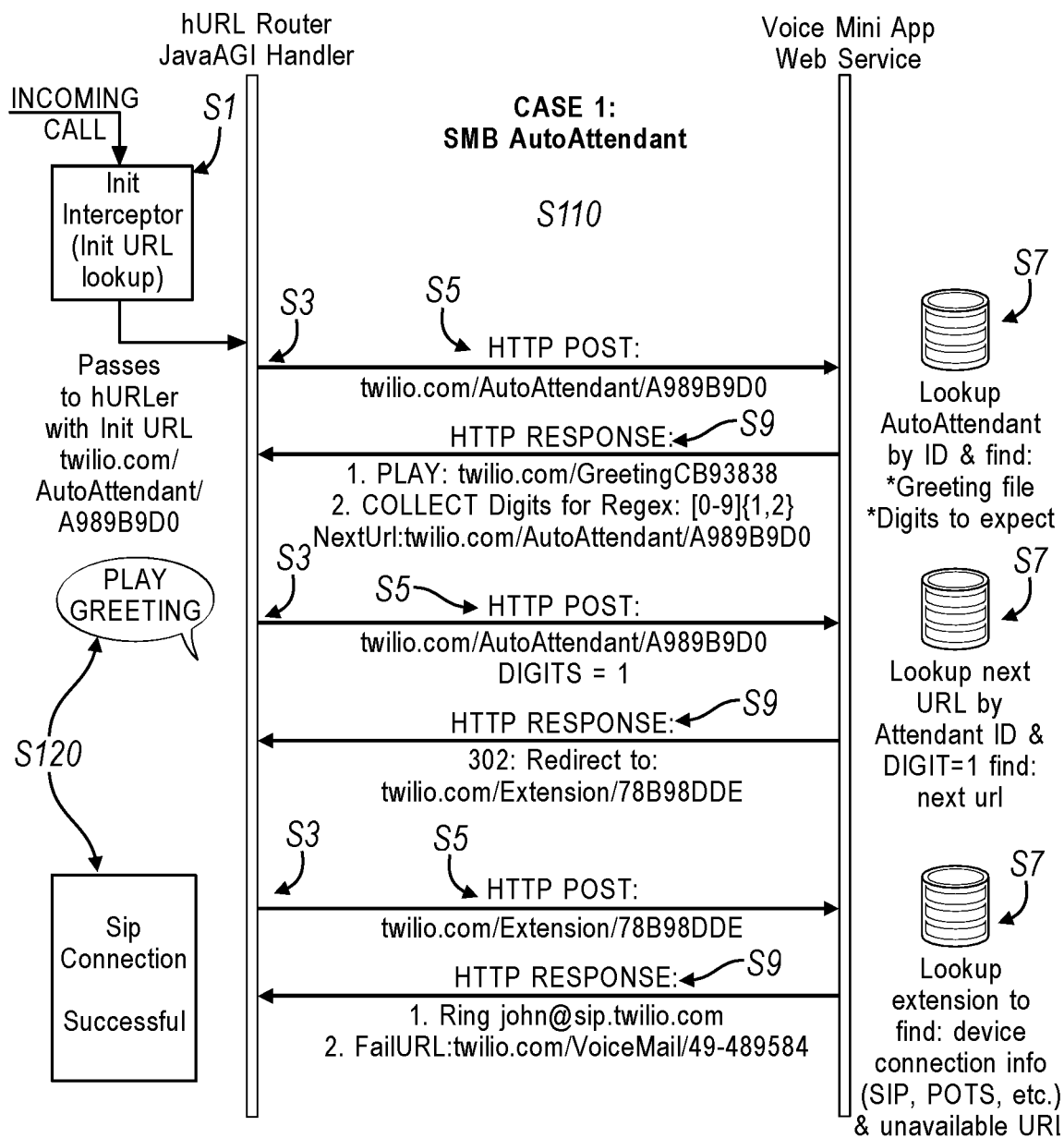
FIGS. 7-15 are schematic representations of various applications that incorporate the principals of the preferred method of the invention.

The AutoAttendant application, as exemplified in FIG. 7, plays a recorded greeting, and waits for the caller to press one or more digits on the keypad. Based on the input, the AutoAttendant preferably directs the call to another AutoAttendant, one or more of phones of a person, a voicemail box or any other valid calling destination.

Figure 8:
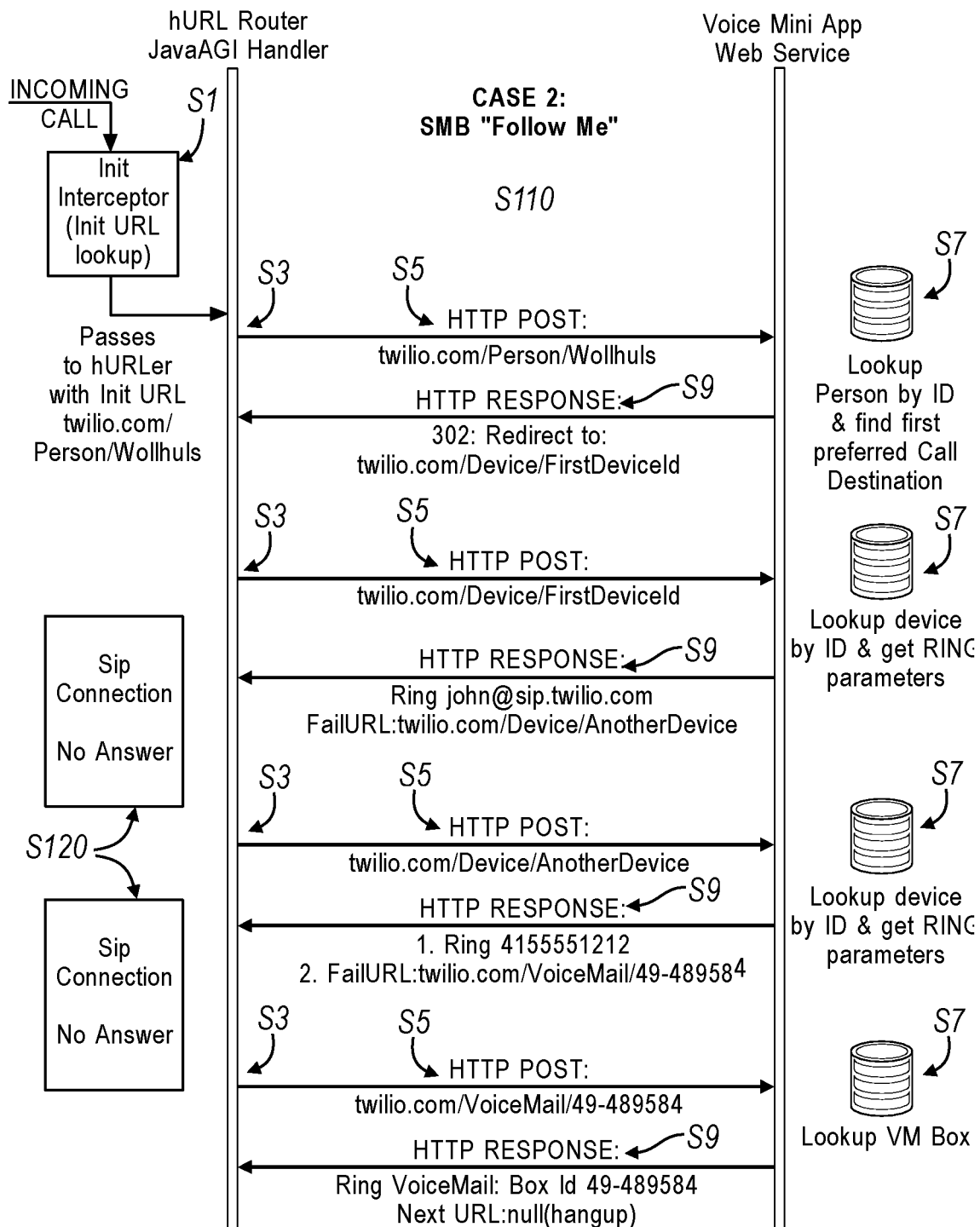

The Follow Me application, as exemplified in FIG. 8, enables a person to be reached at multiple devices, such as a work number, a cellular phone number, a landline, and/or a VOIP device. The Follow Me Application preferably calls these devices in order or simultaneously in an attempt to reach the person.

The Stay With Me application enables a person to transfer an in-progress call between multiple phone devices, such as a cellular phone and a home phone. For example, a user may wish to transfer a call from a more expensive cellular call to a less expensive landline phone, or may wish to transfer a call to a landline phone if a cellular phone battery is running low.

Figure 9:
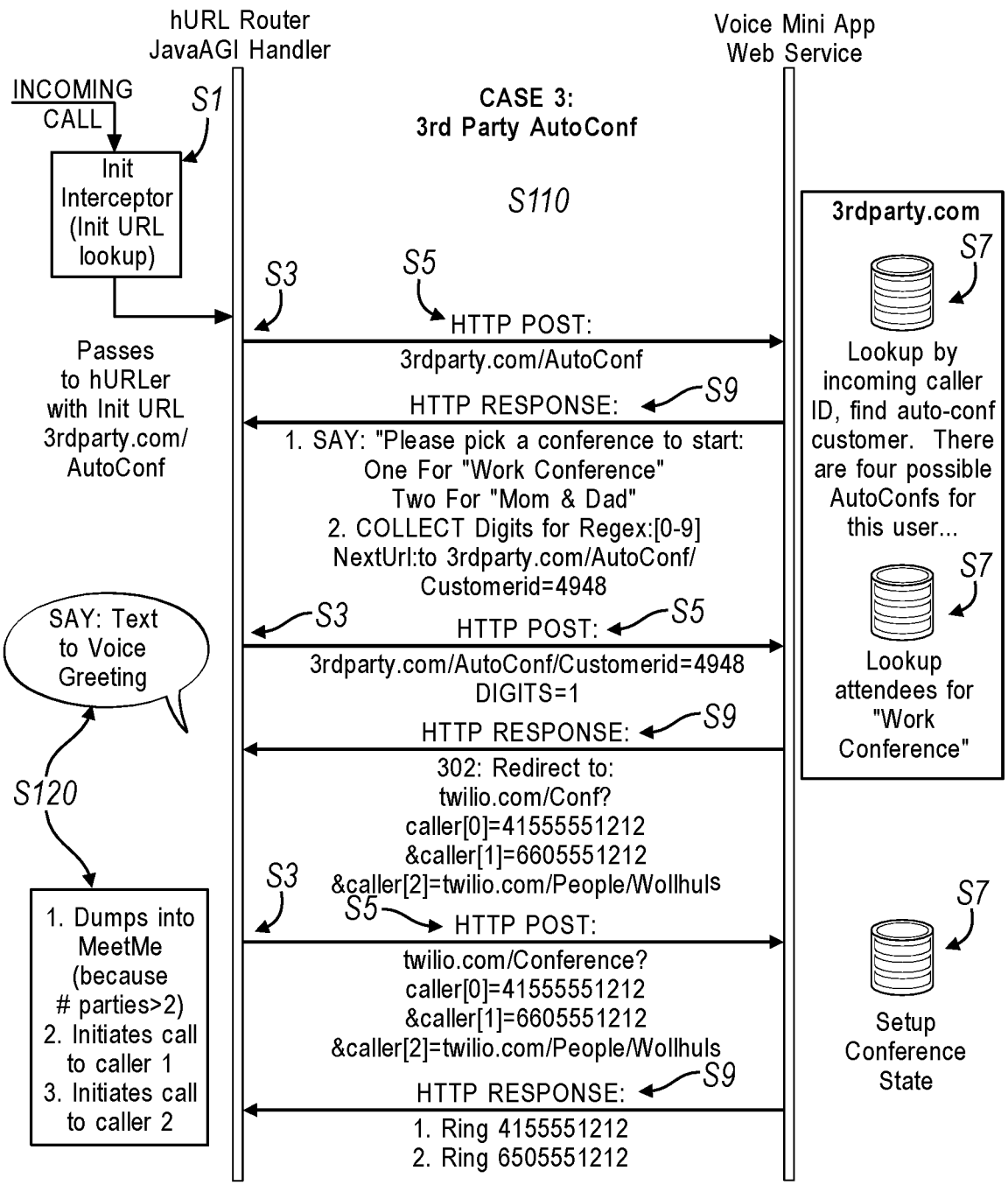

The Conference application, as exemplified in FIG. 9, preferably allows three or more callers to participate in a call simultaneously, while providing mechanisms to control who can join and speak during the call. The Conference application may alternatively or additionally incorporate SMS messaging control. The Conference application upon receipt of an SMS message including multiple phone numbers, may initiate a conference call to one or more parties, using the single SMS.

The AutoConference application preferably allows a conference administrator to initiate a conference call with two or more parties by performing one action, such as selecting a button on a website, selecting a button on a phone device, dialing a phone number, or scheduling the call prior to its initiation. Examples of the AutoConference application implemented using the preferred method of the invention are shown in FIG. 9 (viewed from the PSTN-device side), FIG. 10 (viewed from the application server side), and FIG. 11 (initiated by an application server using the call router API).

The Device application represents a telephone used within the phone system, and may be a hard phone (hardware) or soft phone (software), a VOIP phone or a traditional PSTN phone. The Device application handles configuration details and device status (Do Not Disturb, Busy, etc.).

The Person application represents a human-being user of a telephone system. The Person may have one or more extensions, devices, and/or voicemail boxes, and may have a preferred order in which to ring their phones or voicemail. A person may have a username and password with which to login and update these settings.

The VoicemailBox application preferably plays a greeting, and allows the caller to record a message. Once complete, the recorded message may be stored for later listening, emailed as an audio link or attachment, or both. A list of current messages for a VoicemailBox may be retrieved by dialing in, via API, via RSS feed, and/or any other suitable method or device. In one variation, the audio recording may be automatically transcribed, transforming speech to text. The text is preferably included in the email or text message along with the audio link, attachment, and/or retrievable later by any suitable means of the API.

The Group application preferably represents a logical grouping of other Call Router Application objects, including other Groups. The Group preferably defines the behavior of calls directed to the group, including queuing, hunting for the first available party, and simultaneously ringing multiple parties.

Figure 12:
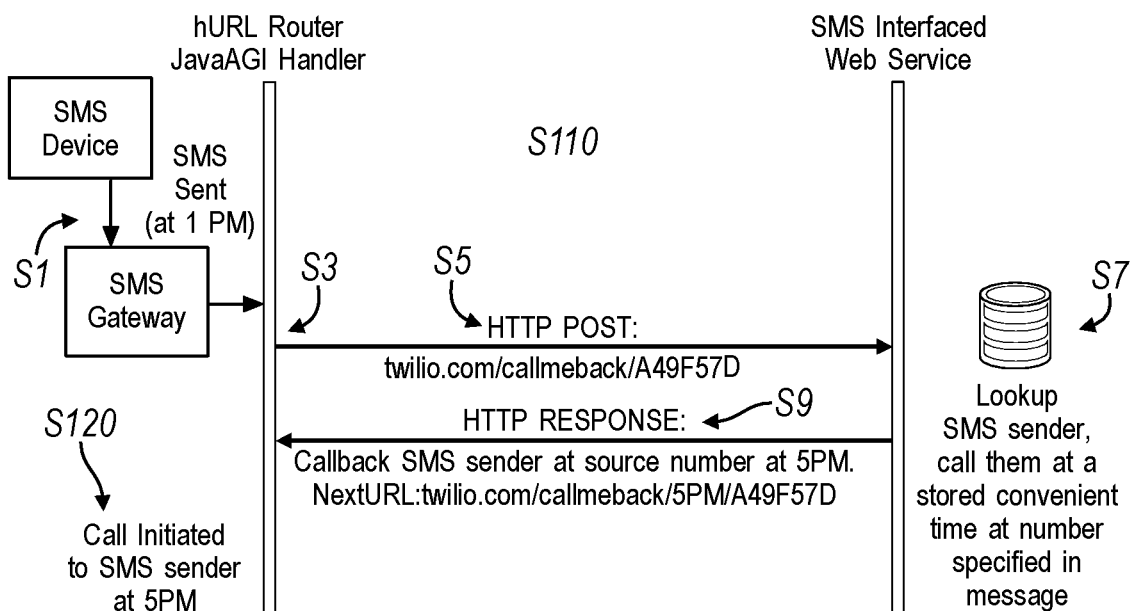

The Queuing application preferably, upon receipt of a phone call or an SMS message, enters the message sender to a telephony call queue and the message sender is called back via the PSTN, SIP/VoIP network or other telephony network, as exemplified in FIG. 12. The call may be placed either at the message' originating number or another pre-specified number, either when a human/operator/service is available (customer service applications) at a pre-scheduled time, such as a wake-up call, anniversary reminder, birthday reminder.

The call router applications may additionally or alternatively include:

a Busy Signal Buster service that, upon receipt of an SMS message or phone call transmitting a number to be called that is currently busy, and calls the SMS message sender back at the message' originating number or another pre-specified number when the number is no longer busy;

a SMS Reader/TTY application that, upon receipt of an SMS, translates the text into audio, using a text-to-speech engine to a caller or the members of an audio conference (e.g., to tell them you will join the call in a few minutes), or for the hearing impaired to use instead of TTY services;

a Translation application that, upon receipt of an SMS message containing a phrase in a language, translates the language of the SMS message into another language (either manually by a human or automatically by a program) and sends a response message via SMS or email; and a Programming application that, upon receipt of an SMS message containing programming code, could compile the code and execute the code, update a website, update a programming project, return data from a database, return a generated computer graphics object as an MMS message, or any other suitable program compilation or computation.

The call router applications may additionally or alternatively include a Status/Notification application that allows users to get or send the status of an object, task, or process by sending an SMS message and receiving a call back via the PSTN, SIP/VoIP network or other telephony network. The service may be used by an operator sending an SMS message with the name of a particular server and then get a call back on her mobile phone and hear the status of that server read aloud. The service may also be used for notification, i.e. to call other parties. For example, a store manager may want to let employees know what time a store is opening the next day. The manager could send an SMS message that would then call each employee and tell him or her over the phone the time when the store was opening the next day, and or what time they needed to arrive at work.

The call router applications may, however, include any collection and/or permutation or these or other suitable prebuilt telephony functions and features.

Applications of the preferred method may include simple PBX functionality, such as auto-attendant voice menus, employee extensions, and voicemail features. The application may also include other, unconventional, applications such as an Interactive Hold application, a Conference Calling application, an Independent Music Hold Channel, a Voting/Fundraising application, a Sales Application, a Blog by phone service and a Call Annotation application.

The Interactive Hold application preferably includes interactive activities, such as a playing a quiz game to be played while on hold (with or without the ability to be played against other callers), listening to news headlines or podcasts of the choice of the listener, and using a phone keypad as a synthesizer to create music in realtime. The Conference Calling application may, as an example, include selecting particular (or random) users from a phone book and instantly substantiating a conference call to the group, with the ability to save the group for future calling. The Independent Music Hold Channel preferably allows independent artists to upload, classify, and grant permission for their works to be played while a caller is on hold. The Voting/Fundraising application preferably connects willing callers (calling to encourage voting or to raise funds for a cause), to potential voters and/or donors respectively, preferably including an interface for the caller to display information about the voter/donor and to make notes about the voter's response to the call. The Sales Application preferably allows sales organizations to quickly integrate inbound and outbound calls with customer relationship management (CRM) applications, or read order details from a shopping cart application. Finally, the Call Annotation application allows call participants to append meta-data, such as reference URIs used in the phone conversation, to a specific call and a timestamp within the call. Participants on the call with a suitable user agent could view the annotations during the call, and people listening to a later replay of the call audio could also receive such annotations at the same timestamp during the playback. The Call Annotation may be used, for example, to facilitate conference call note taking, employee training, sales team collaboration, and/or customer support collaboration.

Applications may alternatively include hold or park functionality, where a caller is placed in a waiting state until an external event resumes the call, such as another party becoming available. One variation of this application is the call queue, where callers wait for an available attendant to answer a call. Applications of the preferred method may alternatively include other conventional or unconventional PBX functionality.

As a person skilled in the art will recognize from the previous detailed description and from the figures and claims, modifications and changes can be made to the preferred embodiments of the invention without departing from the scope of this invention defined in the following claims. It is possible, and indeed hoped, that additional applications will be designed and built upon this technology platform (the preferred method and/or system of the invention) that would not otherwise be possible using conventional telephony platforms.

We claim:

1. A method comprising:
   sending, from a device, using a uniform resource locator (URL), a request to an application, the request comprising parameters including account information and phone number information of a telephony session;
   receiving, at the device and from the application, a response to the request, the response including at least one telephony instruction; and
   executing, based on the at least one telephony instruction, a telephony action for the telephony session.

2. The method of claim 1, wherein the parameters further comprise state information of the telephony session.

3. The method of claim 1, wherein the parameters further comprise an indication of dual tone multi frequency (DTMF) digits received in the telephony session.

4. The method of claim 1, wherein the parameters further comprise second phone number information of the telephony session.

5. The method of claim 1, wherein the parameters further comprise a unique identifier of the telephony session.

6. The method of claim 1, wherein the parameters further comprise a status of the telephony session.

7. The method of claim 1, wherein the parameters further comprise a representation of a sound recording.

8. The method of claim 1, wherein the parameters further comprise a result of a second telephony action.

9. The method of claim 1, wherein the parameters further comprise geographic data regarding a participant in the telephony session.

10. The method of claim 1, further comprising:
    associating the URL with an endpoint.

11. The method of claim 10, further comprising:
    initiating the telephony session with the endpoint.

12. The method of claim 1, wherein the telephony session is a voice session.

13. The method of claim 1, wherein the telephony session is a short messaging service (SMS) session.

14. The method of claim 1, wherein the telephony session is a multimedia messaging service (MMS) session.

15. A call router system configured to perform operations comprising:
    sending, using a uniform resource locator (URL), a request to an application, the request comprising parameters including account information and phone number information of a telephony session;
    receiving, from the application, a response to the request, the request including at least one telephony instruction; and
    executing, based on the at least one telephony instruction, a telephony action for the telephony session.

16. The call router system of claim 15, wherein the parameters further comprise state information of the telephony session.

17. The call router system of claim 15, wherein the parameters further comprise an indication of dual tone multi frequency (DTMF) digits received in the telephony session.

18. The call router system of claim 15, wherein the parameters further comprise second phone number information of the telephony session.

19. The call router system of claim 15, wherein the parameters further comprise a unique identifier of the telephony session.

20. The call router system of claim 15, wherein the parameters further comprise a status of the telephony session.

* * * * *

UNITED STATES PATENT AND TRADEMARK OFFICE
CERTIFICATE OF CORRECTION

| | | |
|---|---|---|
| PATENT NO. | : 11,444,985 B2 | Page 1 of 1 |
| APPLICATION NO. | : 17/061307 | |
| DATED | : September 13, 2022 | |
| INVENTOR(S) | : Lawson et al. | |

It is certified that error appears in the above-identified patent and that said Letters Patent is hereby corrected as shown below:

On the Title Page

On page 6, in Column 1, item [56], Line 69, delete "2009/0022131" and insert --2009/0221310-- therefor On page 7, in Column 1, item [56], Line 33, delete "2012/0017361" and insert --2012/0173610-- therefor On page 7, in Column 2, item [56], Line 42, delete "2014/0037251" and insert --2014/0372510-- therefor On page 8, in Column 1, item [56], Line 7, delete "2019/0034941" and insert --2019/0349410-- therefor Signed and Sealed this
Fourth Day of July, 2023

Katherine Kelly Vidal
*Director of the United States Patent and Trademark Office*